US011919316B2

(12) United States Patent
Kanbe et al.

(10) Patent No.: US 11,919,316 B2
(45) Date of Patent: *Mar. 5, 2024

(54) PRINTING FLUID CARTRIDGE, PRINTING APPARATUS, AND USE OF PRINTING FLUID CARTRIDGE

(71) Applicant: Brother Kogyo Kabushiki Kaisha, Nagoya (JP)

(72) Inventors: Tomohiro Kanbe, Nagoya (JP); Hirotake Nakamura, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/173,616

(22) Filed: Feb. 23, 2023

(65) Prior Publication Data

US 2023/0191791 A1 Jun. 22, 2023

Related U.S. Application Data

(63) Continuation of application No. 17/710,875, filed on Mar. 31, 2022, now Pat. No. 11,613,127, which is a (Continued)

(30) Foreign Application Priority Data

Aug. 30, 2011 (JP) ................................ 2011-187779

(51) Int. Cl.
*B41J 2/175* (2006.01)

(52) U.S. Cl.
CPC ........... *B41J 2/17526* (2013.01); *B41J 2/175* (2013.01); *B41J 2/17513* (2013.01); (Continued)

(58) Field of Classification Search
CPC .... B41J 2/17513; B41J 2/17526; B41J 2/175; B41J 2/1752; B41J 2/17553; B41J 2/1753;
(Continued)

(56) References Cited

U.S. PATENT DOCUMENTS

| | | | |
|---|---|---|---|
| 5,506,611 | A | 4/1996 | Ujita et al. |
| 5,661,510 | A | 8/1997 | Brandon et al. |

(Continued)

FOREIGN PATENT DOCUMENTS

| | | | |
|---|---|---|---|
| CN | 1491798 | A | 4/2004 |
| CN | 1558831 | A | 12/2004 |

(Continued)

OTHER PUBLICATIONS

European Patent Office, extended European Search Report for European Patent Application No. 1195258.6 (related to U.S. Appl. No. 14/034,497), dated Apr. 11, 2012.

(Continued)

*Primary Examiner* — Jannelle M Lebron
(74) *Attorney, Agent, or Firm* — Baker Botts L.L.P.

(57) ABSTRACT

A printing fluid cartridge includes a front face oriented toward a first direction, a printing fluid supply portion positioned at the front face, a rear face positioned opposite the front face and oriented toward a second direction opposite the first direction, at least one electrical interface positioned between the front face and the rear face, and an engagement surface facing in the second direction. The at least one electrical interface is offset from the printing supply portion with respect to a third direction perpendicular to the first direction and the second direction. The at least one electrical interface is positioned closer to the front face than the engagement surface is, and the at least one electrical interface and the engagement surface intersect a plane which (Continued)

is parallel with the first direction, the second direction, and the third direction.

20 Claims, 11 Drawing Sheets

Related U.S. Application Data continuation of application No. 17/034,712, filed on Sep. 28, 2020, now Pat. No. 11,472,192, which is a continuation of application No. 16/374,610, filed on Apr. 3, 2019, now Pat. No. 10,821,739, which is a continuation of application No. 15/903,330, filed on Feb. 23, 2018, now Pat. No. 10,293,614, which is a continuation of application No. 15/149,411, filed on May 9, 2016, now Pat. No. 9,931,856, which is a continuation of application No. 14/747,626, filed on Jun. 23, 2015, now Pat. No. 9,358,798, which is a continuation of application No. 14/034,497, filed on Sep. 23, 2013, now Pat. No. 9,079,412, which is a continuation of application No. 13/371,144, filed on Feb. 10, 2012, now Pat. No. 8,585,193.

(52) U.S. Cl.
CPC ........... *B41J 2/1752* (2013.01); *B41J 2/1753* (2013.01); *B41J 2/17553* (2013.01); *B41J 2/17566* (2013.01)

(58) Field of Classification Search
CPC B41J 2/17566; B41J 2/17546; B41J 2/17523; B41J 2/17509; B41J 2/17503; B41J 2/17543; B41J 2/1755
See application file for complete search history.

(56) References Cited

U.S. PATENT DOCUMENTS

| | | | |
|---|---|---|---|
| 5,777,646 A | 7/1998 | Barinaga et al. | |
| 5,949,459 A | 9/1999 | Gasvoda et al. | |
| 6,474,800 B1 | 11/2002 | Baitz et al. | |
| 7,950,789 B2 | 5/2011 | Matsumoto et al. | |
| 8,007,091 B2 | 8/2011 | Nakamura et al. | |
| 8,596,771 B2 | 12/2013 | Takagi et al. | |
| 9,358,798 B2 | 6/2016 | Kanbe et al. | |
| 9,782,974 B2 | 10/2017 | Kanbe et al. | |
| 10,821,739 B2 | 11/2020 | Kanbe et al. | |
| 11,613,127 B2 * | 3/2023 | Kanbe .................... | B41J 2/1753 347/86 |
| 2003/0035026 A1 | 2/2003 | Goin et al. | |
| 2003/0051904 A1 | 3/2003 | Aruga | |
| 2003/0071874 A1 | 4/2003 | Ishizawa et al. | |
| 2005/0036015 A1 | 2/2005 | Seino et al. | |
| 2005/0151811 A1 | 7/2005 | Shimizu et al. | |
| 2005/0179750 A1 | 8/2005 | Hayasaki et al. | |
| 2005/0185034 A1 | 8/2005 | Anma et al. | |
| 2005/0219303 A1 | 10/2005 | Matsumoto et al. | |
| 2005/0275700 A1 | 12/2005 | Buchanan et al. | |
| 2006/0087538 A1 | 4/2006 | Amma et al. | |
| 2006/0164480 A1 | 7/2006 | Harada et al. | |
| 2007/0040874 A1 | 2/2007 | Matsumoto | |
| 2007/0139495 A1 | 6/2007 | Hattori et al. | |
| 2007/0229615 A1 | 10/2007 | Hattori et al. | |
| 2008/0089041 A1 | 4/2008 | Aruga | |
| 2009/0027464 A1 | 1/2009 | Berg | |
| 2009/0039002 A1 | 2/2009 | Umeda | |
| 2009/0079805 A1 | 3/2009 | Hattori et al. | |
| 2009/0135237 A1 | 5/2009 | Nakamura et al. | |
| 2009/0141056 A1 | 6/2009 | Nakamura et al. | |
| 2009/0141106 A1 | 6/2009 | Takagi | |
| 2010/0045755 A1 | 2/2010 | Kobayashi | |
| 2010/0225704 A1 | 9/2010 | Aoki et al. | |
| 2010/0277555 A1 | 11/2010 | Katoh et al. | |
| 2011/0001781 A1 | 1/2011 | Ishibe | |
| 2011/0310187 A1 | 12/2011 | Kanbe et al. | |

FOREIGN PATENT DOCUMENTS

| | | | |
|---|---|---|---|
| CN | 1659035 | A | 8/2005 |
| CN | 1219647 | C | 9/2005 |
| CN | 101015993 | A | 8/2007 |
| CN | 100389961 | C | 5/2008 |
| DE | 202011002964 | U1 | 6/2011 |
| DE | 102010008870 | A1 | 8/2011 |
| EM | RCD000131735-0003 | | 6/2004 |
| EM | RCD000656624-0001 | | 2/2007 |
| EM | RCD001831512-0002 | | 3/2011 |
| EP | 0713778 | A2 | 5/1996 |
| EP | 0778145 | A1 | 6/1997 |
| EP | 1164025 | A1 | 12/2001 |
| EP | 1234675 | A2 | 8/2002 |
| EP | 1348559 | A1 | 10/2003 |
| EP | 1512536 | A1 | 3/2005 |
| EP | 1547783 | A2 | 6/2005 |
| EP | 2095961 | A1 | 9/2009 |
| JP | 2005-007893 | A | 1/2005 |
| JP | 2007-160714 | A | 6/2007 |
| JP | 2007-266618 | A | 10/2007 |
| JP | 2007-268948 | A | 10/2007 |
| JP | 2009-131971 | A | 6/2009 |
| JP | 2009-132098 | A | 6/2009 |
| WO | 98/55318 | A1 | 12/1998 |
| WO | 2008/104110 | A1 | 9/2008 |
| WO | 2010/094199 | A1 | 8/2010 |

OTHER PUBLICATIONS

State Intellectual Property Office of the People's Republic of China, Notification of First Office Action for Chinese Patent Application No. 201110435154.X (related to U.S. Appl. No. 14/034,497), dated Jun. 27, 2014.

European Patent Office, Extended European Search Report issued for European Patent Application No. 14183672.6 (related to above-captioned patent application), dated Jan. 22, 2016.

State Intellectual Property Office of the People's Republic of China; Notification of First Office Action issued for Chinese Patent Application No. 201510810568.4, dated Sep. 29, 2016.

State Intellectual Property Office of the People's Republic of China, Notification of First Office Action issued for Chinese Patent Application No. 201510809923.6, dated Oct. 9, 2016.

European Patent Office; Notice of Opposition filed against European Patent No. 2607083, mailed Jun. 24, 2015.

European Patent Office; Opponent's Writ of Opposition filed against European Patent No. 2607083, dated Jul. 22, 2016.

European Patent Office; EP Communication Rule 115(1)—Summons to Attend Oral Proceedings issued for EP Patent Application No. 11195258.6, mailed Feb. 14, 2017.

European Patent Office; Community Design No. GGM 000656624-0001 registered with the Office for Harmonization in the Internal Market, submitted during opposition period for EP Patent Application No. 11195258.6.

European Patent Office; Community Design No. GGM001831512-0002 registered with the Office for Harmonization in the Internal Market, submitted during opposition period for EP Patent Application No. 11195258.6.

European Patent Office, Decision Rejection the Opposition (Art. 101(2) EPC), issued in Application No. EP 11195258.6, dated Dec. 7, 2017.

European Patent Office, Boards of Appeal, Opponent's Grounds of Appeal in European Patent No. 2607083, dated Mar. 26, 2018.

The Decision of the Boards of Appeal of the European Patent Office in T 0760/10-3.2.07 dated May 10, 2012 (Appendix E7 to the Opponent's Grounds of Appeal in European Patent No. 2607083, dated Mar. 26, 2018, see English translation, p. 7, lines 4-8).

Basic Operation Guide for Epson Stylus Photo RX700 Series (relevant pages only) (Appendix E6-1 to the Opponent's Grounds of Appeal in European Patent No. 2607083, dated Mar. 26, 2018, see English translation, p. 6).

(56) References Cited

OTHER PUBLICATIONS

Short Instruction page for Epson Stylus Photo RX700 Series (Appendix E6-2 to the Opponent's Grounds of Appeal in European Patent No. 2607083, dated Mar. 26, 2018, see English translation, p. 6).

* cited by examiner

PRINTING FLUID CARTRIDGE, PRINTING APPARATUS, AND USE OF PRINTING FLUID CARTRIDGE

CROSS REFERENCE TO RELATED APPLICATION

The present application is a continuation of U.S. patent application Ser. No. 17/710,875, filed on Mar. 31, 2022, which is a continuation of U.S. patent application Ser. No. 17/034,712, filed on Sep. 28, 2020, now U.S. Pat. No. 11,472,192 B2, issued on Oct. 18, 2022, which is a continuation of U.S. patent application Ser. No. 16/374,610, filed on Apr. 3, 2019, now U.S. Pat. No. 10,821,739 B2, issued on Nov. 3, 2020; which is a continuation of U.S. patent application Ser. No. 15/903,330, filed on Feb. 23, 2018, now U.S. Pat. No. 10,293,614 B2, issued on May 21, 2019; which is a continuation of U.S. patent application Ser. No. 15/149,411, filed on May 9, 2016, now U.S. Pat. No. 9,931,856 B2, issued on Apr. 3, 2018; which is a continuation of U.S. patent application Ser. No. 14/747,626, filed on Jun. 23, 2015, now U.S. Pat. No. 9,358,798 B2, issued on Jun. 7, 2016; which is a continuation of U.S. patent application Ser. No. 14/034,497, filed on Sep. 23, 2013, now U.S. Pat. No. 9,079,412 B2, issued on Jul. 14, 2015; which is a continuation of U.S. patent application Ser. No. 13/371,144, filed on Feb. 10, 2012, now U.S. Pat. No. 8,585,193 B2, issued on Nov. 19, 2013; which claims priority to and the benefit of Japanese Application No. 2011-187779, filed on Aug. 30, 2011, the entire disclosures of each of which are incorporated herein by reference in their entirety.

BACKGROUND OF THE INVENTION

1. Field of the Invention

The present invention relates to a printing fluid cartridge, to a printing apparatus comprising such a printing fluid cartridge, and to use of such a printing fluid cartridge.

2. Description of Related Art

A known image printing apparatus, as described in Patent Application Publication No. JP 2009-132098 A, is configured to print an image on a sheet of printing paper. The known image printing apparatus has an inkjet printing head and is configured to eject ink droplets selectively from nozzles of the printing head onto the sheet of printing paper. The ink droplets land on the sheet of printing paper and thereby a desired image is printed on the sheet of printing paper. The known image printing apparatus has an ink cartridge, and the ink cartridge is configured to store ink to be supplied to the printing head. The ink cartridge is configured to be mounted to and removed from a mounting portion provided in the known image printing apparatus.

Another known ink cartridge, as described in Patent Application Publication No. JP 2007-266618, has a circuit board having a semiconductor memory for storing data about the information of the ink cartridge, e.g., the color of ink, the ingredients of ink, the remaining amount of ink, a maintenance status, and etc. The circuit board has electrical interfaces, e.g., pads. When the ink cartridge is mounted to a mounting portion, the electrical interfaces are electrically connected to electrical contacts provided in the mounting portion, such that the data stored in the semiconductor memory can be read out.

SUMMARY OF THE INVENTION

When dust adheres to the electrical interfaces, the electrical connection between the electrical interfaces of the ink cartridge and the contacts of the cartridge mounting portion may become unstable, such that the date fails to be read out from the semiconductor memory.

Therefore, a need has arisen for a printing fluid cartridge and a printing apparatus, which overcome these and other shortcomings of the related art. A technical advantage of the present invention is that a likelihood that electrical connection between a printing fluid cartridge and a cartridge mounting portion via an electrical interface becomes unstable is reduced.

According to an embodiment of the present invention, a printing fluid cartridge comprises a front face oriented toward a first direction, a printing fluid supply portion positioned at the front face, a rear face positioned opposite the front face and oriented toward a second direction opposite the first direction, at least one electrical interface positioned between the front face and the rear face, and an engagement surface facing in the second direction. The at least one electrical interface is offset from the printing supply portion with respect to a third direction perpendicular to the first direction and the second direction. The at least one electrical interface is positioned closer to the front face than the engagement surface is, and the at least one electrical interface and the engagement surface intersect a plane which is parallel with the first direction, the second direction, and the third direction.

With this configuration, an engagement member of a cartridge mounting portion slides on the at least one electrical interface during insertion of the printing fluid cartridge into the cartridge mounting portion. Therefore, dust on the at least one electrical interface may be wiped off and a likelihood that electrical connection between the at least one electrical interface and at least one contact of the cartridge mounting portion becomes unstable is reduced.

Other objects, features, and advantages will be apparent to persons of ordinary skill in the art from the following detained description of the invention and the accompanying drawings.

BRIEF DESCRIPTION OF THE DRAWINGS

For a more complete understanding of the present invention, needs satisfied thereby, and the objects, features, and advantages thereof, reference now is made to the following description taken in connection with the accompanying drawings.

DETAILED DESCRIPTION OF EMBODIMENTS OF THE INVENTION

Embodiments of the present invention, and their features and advantages, may be understood by referring to FIGS. 1-11B, like numerals being used for like corresponding parts in the various drawings.

[Printer 10]

Figure 1:
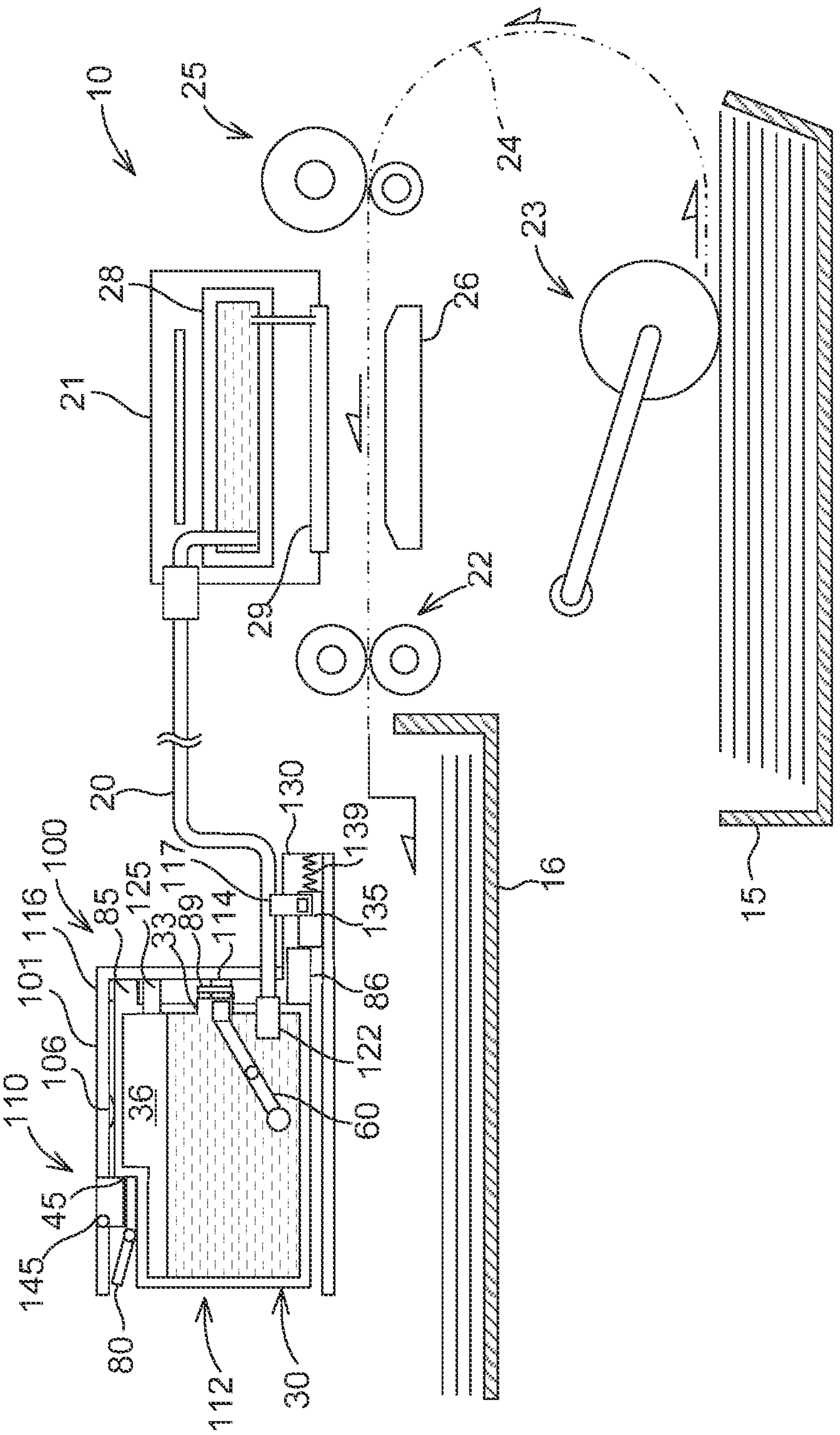
FIG. 1 is a schematic, cross-sectional view of a printer comprising a cartridge mounting portion and an ink cartridge, according to an embodiment of the present invention.

Referring to FIG. 1, a printing apparatus, e.g., a printer 10 is an inkjet printer configured to print an image on a sheet of printing paper by ejecting ink droplets selectively on the sheet of printing paper. The printer 10 comprises an ink supply device 100. The ink supply device 100 comprises a cartridge mounting portion 110. The cartridge mounting portion 110 is configured to allow a printing fluid cartridge, e.g., an ink cartridge 30 to be mounted therein. The cartridge mounting portion 110 has an opening 112 and the interior of the cartridge mounting portion 110 is exposed to the exterior of the cartridge mounting portion 110 via opening 112. The ink cartridge 30 is configured to be inserted into the cartridge mounting portion 110 via the opening 112, such that the ink cartridge 30 is mounted to the cartridge mounting portion 110. The ink cartridge 30 is configured to be removed from the cartridge mounting portion 110 via the opening 112.

The ink cartridge 30 is configured to store ink, which is used by printer 10. The printer 10 comprises a print head 21 and an ink tube 20. The ink cartridge 30 and the print head 21 are fluidically connected via the ink tube 20 when the ink cartridge 30 is mounted to the cartridge mounting portion 110. The print head 21 comprises a sub tank 28. The sub tank 28 is configured to temporarily store ink supplied via the ink tube 20 from the ink cartridge 30. The print head 21 comprises nozzles 29 and is configured to selectively eject ink supplied from the sub tank 28 through the nozzles 29.

The printer 10 comprises a paper feed tray 15, a paper feed roller 23, a conveying roller pair 25, a platen 26, a discharge roller pair 22, and a discharge tray 16. A conveying path 24 is formed from the paper feed tray 15 up to the discharge tray 16 via the conveying roller pair 25, the platen 26, and the discharge roller pair 22. The paper feed roller 23 is configured to feed a sheet of printing paper from the paper feed tray 15 to the conveying path 24. The conveying roller pair 25 is configured to convey the sheet of printing paper fed from the paper feed tray 15 onto the platen 26. The print head 21 is configured to selectively eject ink onto the sheet of printing paper passing over the platen 26. Accordingly, an image is printed on the sheet of printing paper. The sheet of printing paper having passed over the platen 26 is discharged by the discharge roller pair 22 to the paper discharge tray 16 disposed at the most downstream side of the conveying path 24.

[Ink cartridge 30]

Figure 2:
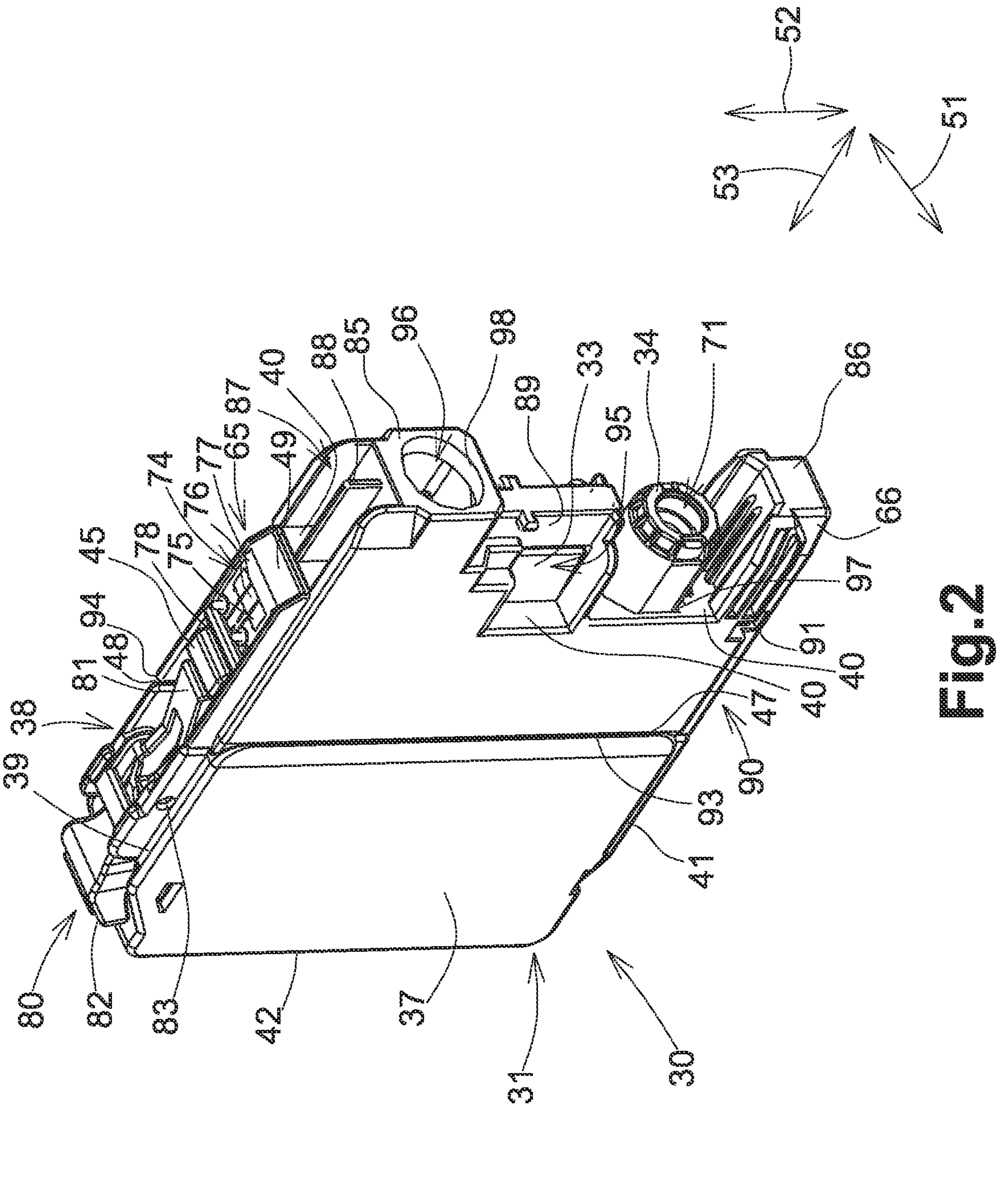
FIG. 2 is a perspective view of the ink cartridge.

Referring to FIGS. 2 to 5, the ink cartridge 30 is configured to be inserted into and removed from the cartridge mounting portion 110 in an insertion/removal direction 50, while the ink cartridge 30 is in an upright position, as shown in FIG. 2, with a top face of the ink cartridge 30 facing upward and a bottom face of the ink cartridge 30 facing downward. The insertion/removal direction 50 extends in a horizontal direction. The ink cartridge 30 is in the upright position when the ink cartridge 30 is mounted to the cartridge mounting portion 110 in the mounted position. The ink cartridge 30 is configured to be inserted into the cartridge mounting portion 110 in an insertion direction 56 and removed from the cartridge mounting portion 110 in a removal direction 55. The insertion/removal direction 50 is a combination of the insertion direction 56 and the removal direction 55. The insertion direction 56 extends in a horizontal direction and the removal direction 55 extends in a horizontal direction. When the ink cartridge 30 is in the upright position, a height direction (up-down direction) 52 corresponds to the gravitational direction (vertical direction). In another embodiment, the insertion/removal direction 50 may not extend exactly in a horizontal direction but may extend in a direction intersecting a horizontal direction and the gravitational direction (vertical direction).

The ink cartridge 30 has a substantially parallelepiped shape and comprises a main body 31 and a bracket 90. The main body 31 and the bracket 90 form the exterior of the ink cartridge 30. The ink cartridge 30 is a container configured to store ink therein. The ink cartridge 30 comprises an ink chamber 36, which is a space formed in the interior of ink cartridge 30. More specifically, the main body 31 comprises the ink chamber 36 formed therein, e.g., the main body 31 comprises an inner frame 35, and the ink chamber 36 is formed in the inner frame 35. The ink cartridge 30 has a width in a width direction (left-right direction) 51, a height in the height direction (up-down direction) 52, and a depth in a depth direction (front-back direction) 53. The width direction (left-right direction) 51, the height direction (up-down direction) 52, and the depth direction (front-back direction) 53 are perpendicular to each other. The width of the ink cartridge 30 is less than the height and the depth of the ink cartridge 30. When ink cartridge 30 is in the mounted position (upright position), the width direction (left-right direction) 51 is parallel with a horizontal plane, the depth direction (front-back direction) 53 is also parallel with the horizontal plane, and the height direction (up-down direction) 52 is parallel with the gravitational direction (vertical direction). When the ink cartridge 30 is inserted into/removed from the cartridge mounting portion 110, the depth direction (front-back direction) 53 is parallel with the insertion/removal direction 50, and the width direction (left-right direction) 51 and the height direction (up-down direction) 52 are perpendicular to the insertion/removal direction 50. The height direction (up-down direction) 52 is parallel with an upward direction and a downward direction and is a combination of the upward direction and the downward direction.

The ink cartridge 30 comprises a front wall 40 and a rear wall 42 opposite the front wall 40 with respect to the insertion direction 56. The front wall 40 is positioned at a front side of the ink cartridge 30 with respect to the insertion direction 56 when the ink cartridge 30 is inserted into the cartridge mounting portion 110. More specifically, the front wall 40 faces in the insertion direction 56, in other words, the front wall 40 is oriented toward the insertion direction 56, when the ink cartridge 30 is inserted into the cartridge mounting portion 110. The rear wall 42 is positioned at a rear side of the ink cartridge 30 with respect to the insertion direction 56 when the ink cartridge 30 is inserted into the cartridge mounting portion 110. More specifically, the rear wall 42 faces in the removal direction 55, in other words, the rear wall 42 is oriented toward the removal direction 55, when the ink cartridge 30 is inserted into the cartridge mounting portion 110. The font wall 40 and the rear wall 42 are aligned in depth direction (front-back direction) 53. The front wall 40 and the rear wall 42 are aligned in the insertion/removal direction 50 when the ink cartridge 30 is inserted into the cartridge mounting portion 110. The ink cartridge 30 comprises side walls 37, 38, each extending in the insertion/removal direction 50 and connected to the front wall 40 and the rear wall 42. The side walls 37 and 38 are aligned in the width direction (left-right direction) 51. The ink cartridge 30 comprises a top wall 39 connected to upper ends of the front wall 40, the rear wall 42, and the side walls 37 and 38. The ink cartridge 30 comprises a bottom wall 41 connected to lower ends of the front wall 40, the rear wall 42, and the side walls 37, 38. The top wall 39 and the bottom wall 41 are aligned in the height direction (up-down direction) 52. An outer face of the front wall 40 is a front face of the ink cartridge 30, and an outer face of the rear wall 42 is a rear face of the ink cartridge 30. Therefore, the front face of the ink cartridge 30 is oriented toward the insertion direction 56 when the ink cartridge 30 is inserted into the cartridge mounting portion 110 in the upright position, and the rear face of the ink cartridge 30 is oriented toward the removal direction 55 when the ink cartridge 30 is inserted into the cartridge mounting portion 110 in the upright position. An outer face of the top wall 39 is a top face of the ink cartridge 30, and an outer face of the bottom wall 31 is a bottom face of the ink cartridge 30. Therefore, the top face of the ink cartridge 30 is oriented in the upward direction when the ink cartridge 30 is inserted into the cartridge mounting portion 110 in the upright position, and the bottom face of the ink cartridge 30 is oriented in the downward direction when the ink cartridge 30 is mounted to the cartridge mounting portion 110 in the upright position. The top face is connected to upper ends of the front face and the rear face, and the bottom face is connected to lower ends of the front face and the rear face. Similarly, outer faces of the side walls 37, 38 are side faces of the ink cartridge 30.

In this embodiment, the bracket 90 comprises the front wall 40, a portion of the side wall 37, a portion of the side wall 38, a portion of the top wall 39, and a portion of the bottom wall 41, and the main body 31 comprises the rear wall 42, the other portion of the side wall 37, the other portion of the side wall 38, the other portion of the top wall 39, and the other portion of the bottom 41. Therefore, the bracket 90 comprises the front face of the ink cartridge 30, a portion of the top face of the ink cartridge 30, a portion of the bottom face of the ink cartridge 30, and portions of the side faces of the ink cartridge 30, and the main body 31 comprises the rear face of the ink cartridge 30, the other portion of the top face of the ink cartridge 30, the other portion of the bottom face of the ink cartridge 30, and the other portions of the side faces of the ink cartridge 30.

[Main body 31]

Figure 3:
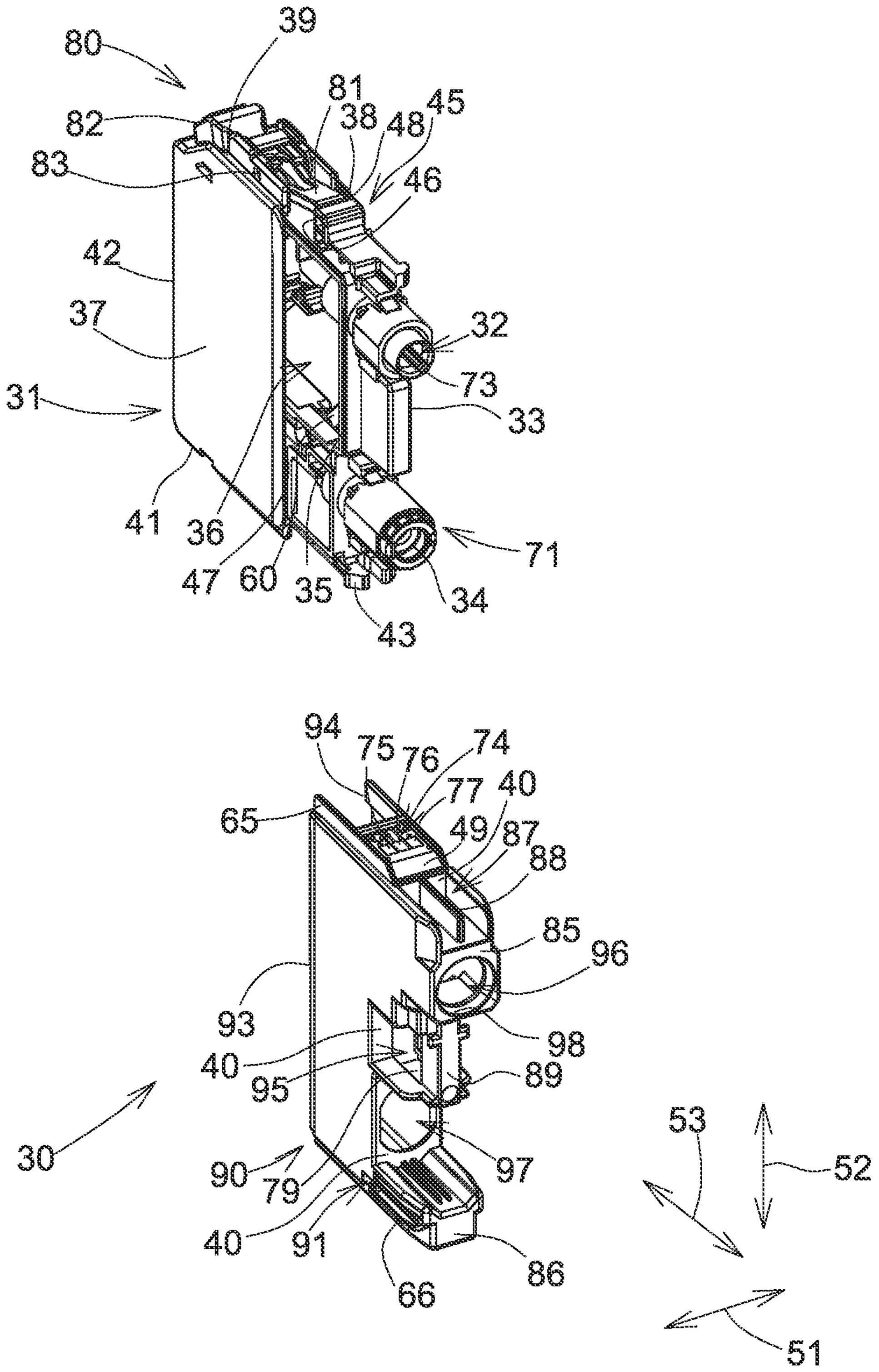
FIG. 3 is an exploded, perspective view of the ink cartridge.
Figure 4:
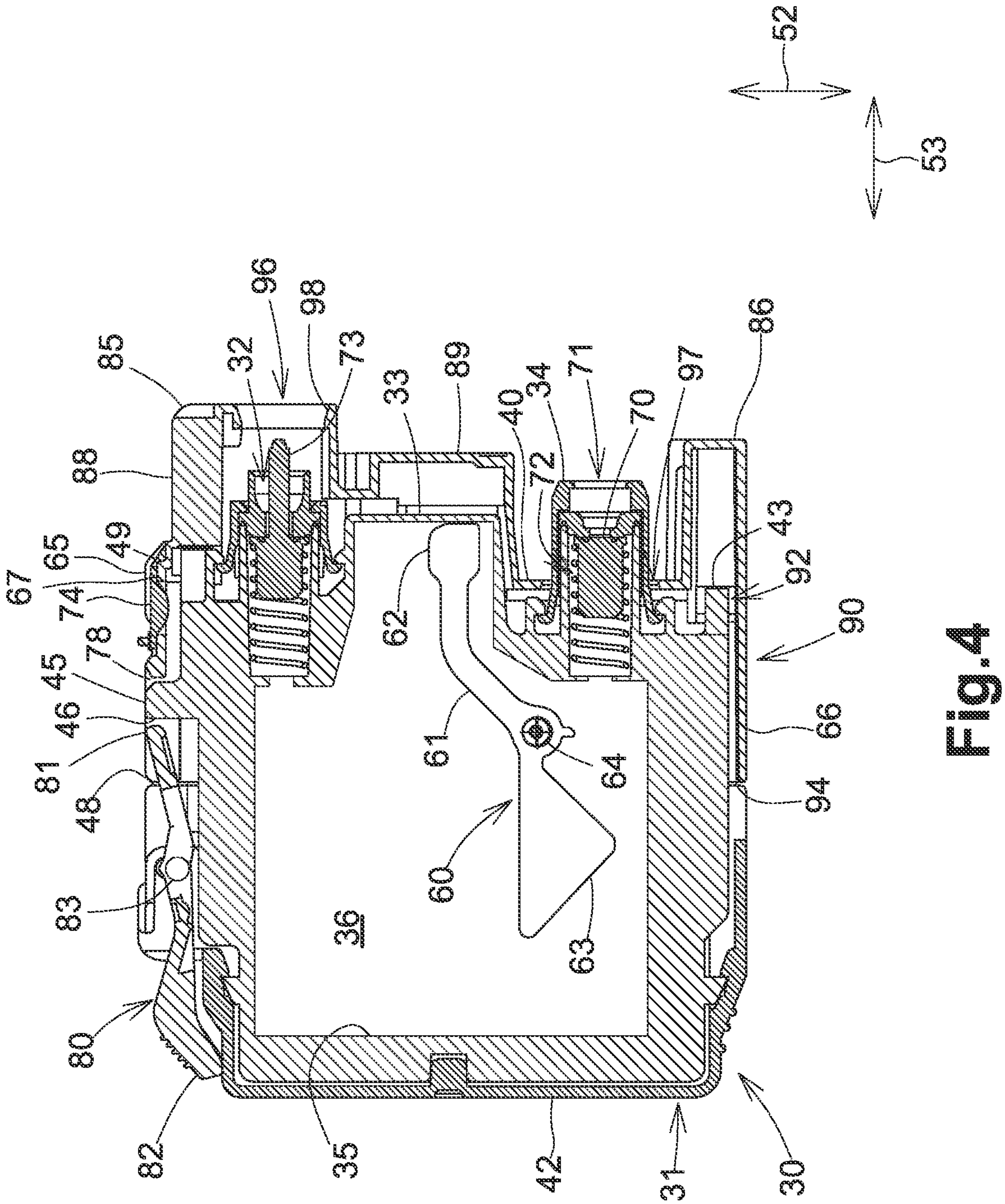
FIG. 4 is a vertical, cross-sectional view of the ink cartridge.

Referring to FIGS. 2 to 4, the main body 31 comprises a detection portion 33 at a middle portion of the main body 31 with respect to the height direction (up-down direction) 52. The detection portion 33 is positioned at a front-wall 40 side of the main body 31. More specifically, the detection portion 33 is positioned at a front face of the main body 31, and the front face of the main body 31 faces in the insertion direction 56, in other words, is oriented towards the insertion direction 56, when the ink cartridge 30 is inserted into the cartridge mounting portion 110. The bracket 90 comprises a first protrusion 85 which comprises a detection portion, e.g., a rib 88. The first protrusion 85 comprises a front end with respect to the insertion direction 56. The rib 88 comprises a front end with respect to the insertion direction 56. The bracket 90 comprises a second protrusion 86. The second protrusion 86 comprises a front end with respect to the insertion direction 56. The bracket 90 comprises another detection portion 89. The detection portion 33 is positioned more rearward than the front end of the first protrusion 85, the front end of the rib 88, the front end of the second protrusion 86, and the detection portion 89 with respect to the insertion direction 56. The detection portion 33 has a box shape having an opening facing the ink chamber 36, such that the interior of the detection portion 36 is in fluid communication with the ink chamber 36. The detection portion 33 comprises a pair of walls made of a translucent, e.g., transparent or semi-transparent, resin configured to allow light, e.g., visible or infrared light, traveling in a direction perpendicular to the insertion/removal direction 50 to pass therethrough. In this embodiment, the direction perpendicular to the insertion/removal direction 50 is the width direction (left-right direction) 51. The detection portion 33 is exposed to the exterior of the ink cartridge 30 via an opening 95 formed through the bracket 90 at a front-wall 40 side of the bracket 90. When the ink cartridge 30 is mounted to the cartridge mounting portion 110, an optical sensor 114 (see FIG. 6) emits light in the direction perpendicular to the insertion/removal direction 50. The detection portion 33 may allow the light which is emitted from the optical sensor 114 and reaches the detection portion 33 via the opening 95 to pass therethrough.

The pair of walls of the detection portion 33 is aligned in the width direction (left-right direction) 51, and a space is formed between the pair of walls of the detection portion 33. Ink stored in the ink chamber 36 can reach this space. Referring to FIG. 4, the main body 31 comprises a sensor arm 60 disposed in the ink chamber 36. The sensor arm 60 comprises an arm body 61 extending mainly in the depth direction (front-back direction) 53, an indicator 62 positioned at one end of the arm body 61, and a float 63 positioned at the other end of the arm body 61. The indicator 62 is positioned in the space formed between the pair of walls of the detection portion 33. The main body 31 comprises a support shaft 64 extending in the width direction (left-right direction) 51, and the sensor arm 60 is supported by the support shaft 64, such that the sensor arm 60 can pivot about the support shaft 64. The sensor arm 60 is configured to pivot based on the amount of ink stored in the ink chamber 36, and therefore the indicator 62 is configured to pivot based on the amount of ink stored in the ink chamber 36. The sensor arm 60 is configured to move between an upper position and a lower position. When the sensor arm 60 is in the upper position, the indicator 62 is positioned at an upper side of the detection portion 33 with respect to the gravitational direction (vertical direction). When the sensor arm 60 is in the lower position, the indicator 62 is positioned at a lower side of the detection portion 33 with respect to the gravitational direction. FIG. 4 depicts the sensor arm 60 positioned in the lower position when the ink chamber 36 has a predetermined amount or more of ink stored therein.

When the ink cartridge 30 is mounted to the cartridge mounting portion 110, the detection portion 33 is positioned between a light emitter and a light receiver of the optical sensor 114, which are aligned in a horizontal direction (the width direction or left-right direction 51) perpendicular to the insertion/removal direction 50, and the detection portion

33 is configured to change its state between a first state and a second state. When the detection portion 33 is in the first state, the detection portion 33 allows light, which is emitted from the light emitter of the optical sensor 114 and travels in the direction (the width direction or left-right direction 51) perpendicular to the insertion/removal direction 50, to pass therethrough. When the detection portion 33 is in the second state, the detection portion 33 attenuates the light. More specifically, when the detection portion 33 is in the first state and the light reaches one side of the detection portion 33 in the direction (width direction or left-right direction 51) perpendicular to the insertion/removal direction 50, a predetermined amount or more of the light comes out of the other side of the detection portion 33 in the direction (the width direction or left-right direction 51) perpendicular to the insertion/removal direction 50 and reaches the light receiver of the optical sensor 114. When the detection portion 33 is in the second state and the light reaches one side of the detection portion 33 in the direction (the width direction or left-right direction 51) perpendicular to the insertion/removal direction 50, the amount of light coming out of the other side of the detection portion 33 and reaching the light receiver of the optical sensor 114 is less than the predetermined amount, e.g., zero. When the sensor arm 60 is in the upper position, the detection portion 33 is in the first state to allow the light to pass therethrough. When the sensor arm 60 is in the in the lower position, the detection portion 33 is in the second state to attenuate the light. The attenuation of the light is caused by the indicator 62 completely preventing the light from passing therethrough in the direction (the width direction or left-right direction 51) perpendicular to the insertion/removal direction 50, by the indicator 62 absorbing some amount of the light, by the indicator 62 deflecting the light, by the indicator 62 totally reflecting the light, and etc. As such, the amount (intensity) of the light reaching the light receiver of the optical sensor 114 depends on the state of the detection portion 33. By detecting the state of the detection portion 33 with the optical sensor 114, it is determined whether the ink chamber 36 has the predetermined amount or more of ink stored therein.

In another embodiment, the ink cartridge 30 may not comprise the sensor arm 60, and therefore the indicator 62 may not be positioned in the detection portion 33. In such a case, when the detection portion 33 stores ink therein, the detection portion 33 may attenuate the light. When the detection portion 33 does not store ink therein, the detection portion 33 may allow the light to pass therethrough. More specifically, when the detection portion 33 does not store ink therein and the light reaches one side of the detection portion 33 in the direction (the width direction or left-right direction 51) perpendicular to the insertion/removal direction 50, the predetermined amount or more of the light may come out of the other side of the detection portion 33 in the direction (the width direction or left-right direction 51) perpendicular to the insertion/removal direction 50 and reaches the light receiver of the optical sensor 114. When the detection portion 33 stores ink therein and the light reaches one side of the detection portion 33 in the direction (the width direction or left-right direction 51) perpendicular to the insertion/removal direction 50, the amount of light coming out of the other side of the detection portion 33 and reaching the light receiver of the optical sensor 114 is less than the predetermined amount, e.g., zero. The attenuation of the light may be caused by the ink absorbing some amount of the light. In yet another embodiment, the detection portion 33 may comprise a flexible film forming a space therein. When ink is stored in the space formed by the flexible film, the flexible film bulges. The ink cartridge 30 may comprise a pivotable lever contacting the flexible film, and the lever may attenuate the light by completely preventing the light from passing therethrough in the direction (the width direction or left-right direction 51) perpendicular to the insertion/removal direction 50, by absorbing some amount of the light, by deflecting the light, by totally reflecting the light, and etc. When the ink moves out of the space formed by the flexible film and the flexible film shrinks, the lever contacting the flexible film may move to a position in which the lever no longer attenuates the light. In still another embodiment, the detection portion 33 comprises a prism-like structure. In such a case, when ink contacts the prism-like structure, the prism-like structure may reflect light such that the light does not reach the light receiver of the optical sensor 114. When ink does not contact the prism-like structure, the prism-like structure may reflect light such that the light reaches the light receiver of the optical sensor 114.

The main body 31 has an air communication opening 32 at the front-wall 40 side of the main body 31 above the detection portion 33. More specifically, the air communication opening 32 is positioned at the front face of the main body 31 facing in the insertion direction 56. The air communication opening 32 is formed through a wall defining the ink chamber 36 in the depth direction (front-back direction) 53. An air layer formed in the ink chamber 36 and the atmosphere outside of the ink chamber 36 can be brought into fluid communication via the air communication opening 32. The air communication opening 32 is positioned between the front portion of the bracket 90 and the rear wall 42 of the main body 31. The bracket 90 has a circular opening 96 formed through a wall of the first protrusion 85 in the depth direction (front-back direction) 53, and the air communication opening 32 is accessible via the opening 96 from the exterior of the ink cartridge 30 in the removal direction 55.

The main body 31 comprises an air communication valve 73 configured to selectively open and close the air communication opening 32. When the air communication opening 32 is opened, the pressure in the ink chamber 36 maintained in a negative pressure becomes equal to the atmospheric pressure. In another embodiment, the air communication opening 32 may not be positioned at the front-wall 40 side of the main body 31 and may be positioned anywhere as long as the interior and the exterior of the ink chamber 36 can be brought into fluid communication. In yet another embodiment, the ink cartridge 30 may be configured to be used in the printer 10 with the ink chamber 36 maintained in negative pressure. In such a case, the ink cartridge 30 may not have the air communication opening 32.

The main body 31 comprises a printing fluid supply portion, e.g., an ink supply portion 34 at the front-wall 40 side of the main body 31 below the detection portion 33. More specifically, the ink supply portion 34 is positioned at the front face of the main body 31 facing in the insertion direction 56. The ink supply portion 34 is positioned at a lower portion of the front face of the main body 31, i.e., at a bottom-wall 41 side of the front face of the main body 31. The bracket 90 has a circular opening 97 formed through the front wall 40 in the depth direction (front-back direction) 53. The ink supply portion 34 has a cylindrical shape and extends through the opening 97 of the front wall 40 in the insertion/removal direction 50. Therefore, the ink supply portion 34 is positioned at the front wall 40. The ink supply portion 34 has an ink supply opening 71 formed at the distal end of the ink supply portion 34.

The ink supply portion 34 has an ink path 72 formed therein. The ink path 72 extends from the ink supply opening 71 up to the ink chamber 36 in the depth direction (front-back direction) 53. The main body 31 comprises an ink supply valve 70 configured to selectively open and close the ink supply opening 71. When the ink cartridge 30 is mounted to the cartridge mounting portion 110, an ink pipe 122 provided in the cartridge mounting portion 110 is inserted through the ink supply opening 71 and pushes the ink supply valve 70 such that the ink supply opening 71 is opened. When this occurs, ink is flowed out of the ink chamber 36 into the ink pipe 122 via the ink path 72 in the insertion direction 56.

In another embodiment, the ink cartridge 30 may not comprise the ink supply valve 70. In such a case, the ink supply opening 71 may be covered and closed by a film. When the ink cartridge 30 is mounted to the cartridge mounting portion 110, the ink pipe 122 may break through the film, such that the ink supply opening 71 is opened.

Referring to FIGS. 3 and 4, the main body 31 comprises an engagement hook 43 at a bottom-wall 41 side and the front-wall 40 side of the main body 31. The engagement hook 43 extends forward in the depth direction (front-back direction) 53 from a lower portion of the front face of the main body 31. The front end of the engagement hook 43 comprises two protrusions extending outward in opposite directions in the width direction (left-right direction) 51. The engagement hook 43 has a cut-out formed therein. The cut-out is positioned at a middle portion of the engagement hook 43 with respect to the width direction (left-right direction) 51 and extends in the depth direction (front-back direction) 53. With this cut-out, the engagement hook 43 is configured to resiliently deform such that a dimension thereof in the width direction (left-right direction) 51 decreases. The protrusions of the front end of the engagement hook 43 are positioned in elongated openings 91, 92 formed through the bracket 90, respectively, and contact inner surfaces of the walls defining the elongated openings 91, 92, respectively.

The main body 31 comprises an engagement portion 45 positioned at a top-wall 39 side of the ink cartridge 30. More specifically, the engagement portion 45 is positioned at a middle portion of the top wall 39 with respect to the depth direction (front-back direction) 53. The engagement portion 45 extends upward from the top wall 39 and away from the ink chamber 36 and comprises an engagement surface 46 which extends in the width direction (left-right direction) 51 and the height direction (up-down direction) 52. The engagement surface 46 faces rearward with respect to the insertion direction 56, in other words, faces in the removal direction 55, when the ink cartridge 30 is inserted into the cartridge mounting portion 110. In another embodiment, the engagement surface 46 may not extend vertically from the top wall 39, but may be inclined with respect to the height direction (up-down direction) 52, and may face rearward with respect to the insertion direction 56, in other words, face in the removal direction 55, and also face in the upward direction when the ink cartridge 30 is inserted into the cartridge mounting portion 110.

When the ink cartridge 30 is mounted to the cartridge mounting portion 110, the engagement surface 46 contacts an engagement member 145 of the cartridge mounting portion 110, and receives an external force. More specifically, when the ink cartridge 30 is mounted to and retained in the cartridge mounting portion 110, the ink cartridge 30 is pushed in the removal direction 55, and therefore, the engagement surface 46 pushes the engagement member 145 in the removal direction 55. As a consequence, the engagement surface 46 receives a reaction force from the engagement member 145 in the insertion direction 56.

The main body 31 comprises a pivot member 80 positioned at an upper side of the main body 31 with respect to the height direction (up-down direction) 52 and at a rear-wall 42 side of the main body 31. More specifically, the pivot member 80 is positioned at a rear portion of the top wall 39. The pivot member 80 has a bent flat-plate shape and its longer dimension extends in a direction substantially parallel with the depth direction (front-back direction) 53. The pivot member 80 comprises a shaft 83 at its bent point. The bent point is positioned at a middle portion of the pivot member 80 with respect to the depth direction (front-back direction) 53. The shaft 83 extends in the width direction (left-right direction) 51. The shaft 83 is supported by the other portion of the main body 31 at a position spaced away from the engagement surface 46 toward the rear wall 42, such that the pivot member 80 can pivot about the shaft 83. The pivot member 80 comprises a front end portion 81 and a rear end portion 82. The front end portion 81 extends from the shaft 83 toward the engagement surface 46. The rear end portion 82 extends from the shaft 83 toward the rear wall 42.

When no external force is applied to the pivot member 80, the pivot member 80 is positioned, such that the front end portion 81 is positioned farthest from the top wall 39, i.e., the front end portion 81 is in the upper most position relative to the top wall 39, due to its own weight, i.e., the rear end portion 82 is heavier than the front end portion 81. When the pivot member 80 is in this position, the front end portion 81 may extend outside beyond an upper end of the other portion of the main body 31. In another embodiment, the front end portion 81 may not extend outside beyond the upper end of the other portion of the main body 31 and may be positioned more inside than the upper end of the other portion of the main body 31, i.e., positioned below the upper end of the other portion of the main body 31. When the front end portion 81 is pushed down, the pivot member 80 pivots in the clockwise direction in FIG. 4 against its own weight. When the pivot member 80 pivots in the clockwise direction to the extent possible, the front end portion 81 is positioned below an upper end of the engagement surface 46. In another embodiment, the pivot member 80 may be integrally formed with the other portion of the main body 31. In yet another embodiment, the pivot member 80 may be biased by a spring in the clockwise direction. In such a case, when the rear end portion 82 is pushed down, the pivot member 80 pivots in the counterclockwise direction against the biasing force of the spring.

As mentioned above, the main body 31 comprises the portions of the side walls 37, 38. Each of the portions of the side walls 37, 38 extends from the rear wall 42 up to a middle portion of the main body 31 with respect to the depth direction (front-back direction) 53. Each of the portions of the side walls 37, 38 comprises a flat plate portion, and a tapered portion at the front of the flat plate portion with respect to the depth direction (front-back direction) 53. More specifically, each of the flat plate portion comprises a planar outer surface extending in the depth direction (front-back direction) 53 and the height direction (up-down direction) 52 and a planar inner surface extending in the depth direction (front-back direction) 53 and the height direction (up-down direction) 52. The tapered portion comprises a planar outer surface extending in the depth direction (front-back direction) 53 and the height direction (up-down direction) 52 and an inclined inner surface 47 or 48 extending in a direction inclined to the depth direction (front-back direction) 53 and extending in the height direction (up-down direction) 52. The portion of the side wall 37 comprises the inclined inner surface 47 and the portion of the side wall 38 comprises the inclined inner surface 48. When the bracket 90 is not attached to the main body 31 before the ink cartridge 30 is assembled, a front portion of the inner frame 35 defining the ink chamber 36 is not covered by the portions of the side walls 37, 38 and is exposed.

[Bracket 90]

The bracket 90 is attached to the main body 31. The bracket 90 covers a front portion of the main body 31 extending from around the inner inclined surfaces 47, 48 to the front face of the main body 31 facing in the insertion direction 56. More specifically, the bracket 90 covers the front face of the main body 31, the side-wall 37 side of the front portion of the main body 31, the side-wall 38 side of the front portion of the main body 31, the top-wall 39 side of the front portion of the main body 31, and the bottom-wall 41 side of the front portion of the main body 31. In other words, the bracket 90 covers the front face of the main body 31, a top face, a bottom face, and side faces of the front portion of the main body 31.

As described above, the bracket 90 comprises the portions of the side walls 37, 38.

The portions of the side walls 37, 38 have the elongated openings 91, 92 formed therethrough, respectively. The elongated openings 91, 92, are positioned at bottom-wall 41 sides of the portions of the side walls 37, 38, respectively. In other words, the elongated openings 91, 92 are positioned at lower portions of the portions of the side walls 37, 38. Each of the elongated openings 91, 92 has a longer dimension in the height direction (up-down direction) 52. The protrusions of the front end of the engagement hook 43 are positioned in the elongated openings 91, 92, respectively, and contact inner surfaces of the walls defining the elongated openings 91, 92, respectively. If the bracket 90 is attempted to be removed from the main body 31 by pulling the bracket 90 in the depth direction (front-back direction) 53, the protrusions of the front end of the engagement hook 43 are hooked on the inner surfaces of the walls defining the elongated openings 91, 92, such that the bracket 90 cannot be removed from the main body 31. The dimension of each of the protrusions of the front end of the engagement hook 43 in the height direction (up-down direction) 52 is less than the dimension of each of the elongated openings 91, 92 in the height direction (up-down direction) 52. The portions of the side walls 37, 38 comprise end portions 93, 94 at a rear-wall 42 side thereof, respectively. The end portions 93, 94 extend in the height direction (up-down direction) 52 and are covered by the tapered portions of the portions of the side walls 37, 38 of the main body 31, respectively. The end portions 93, 94 face the inclined inner surfaces 47, 48 of the tapered portions, respectively, i.e., the end portions 93, 94 overlap the inclined inner surfaces 47, 48 in the width direction (left-right direction) 51. The bracket 90 is configured to move relative to the main body 31 in the height direction (up-down direction) 52 within a range defined by the dimension of the elongated openings 91, 92 in the height direction (up-down direction) 52 allowing the protrusions of the front end of the engagement hook 43 to slide within the elongated openings 91, 92 in the height direction (up-down direction) 52. In other words, there is a space between each one of the protrusions of the front end of the engagement hook 43 and an end of a corresponding one of the elongated openings 91, 92 in the height direction (up-down direction) 52, such that the bracket 90 can slide on the main body 31 in the height direction (up-down direction) 52. When the bracket 90 moves relative to the main body 31, the end portions 93, 94 of the bracket 90 slides on the inclined inner surfaces 47, 48, respectively. In other words, the inclined inner surfaces 47, 48 function as guides when the bracket 90 moves relative to the main body 31. The bracket 90 is supported by an upper surface of the front portion of the main body 31 from below in a normal state.

The bracket 90 has the opening 95 formed therethrough in the width direction (left-right direction) 51. The opening 95 is positioned at the front-wall 40 side of the bracket 90 at a middle portion of the bracket 90 with respect to the height direction (left-right direction) 52. In this embodiment, the opening 95 has a rectangular shape, but can have any other suitable shape according to modified embodiments. The opening 95 has dimensions and size corresponding to the detection portion 33 of the main body 31 and is in a position corresponding to the detection portion 33, such that the detection portion 33 is exposed to the exterior of the ink cartridge 30 via the opening 95 in the width direction (left-right direction) 51. A portion of the bracket 90 defining the opening 95 comprises the detection portion 89 extending in the height direction (up-down direction) 52, and a support portion 79 extending from the lower end of the detection portion 89 in the depth direction (front-back direction) 53 toward the main body 31 and configured to support the detection portion 33 from below. When the bracket 90 is supported by the upper surface of the front portion of the main body 31 from below, there is a space between the detection portion 33 and the support portion 79. When the bracket 90 moves in the upward direction relative to the main body 31, the support portion 79 contacts a lower end of the detection portion 33. The range within which the bracket 90 moves relative to the main body 31 in the height direction (up-down direction) 52 can be defined by the dimension of the elongated openings 91, 92 in the height direction (up-down direction) 52 allowing the protrusions of the front end of the engagement hook 43 to slide within the elongated openings 91, 92 in the height direction (up-down direction) 52 or can be defined by the space between the detection portion 33 and the support portion 79 formed when the bracket 90 is supported by the upper surface of the front portion of the main body 31 from below.

The bracket 90 has the opening 96 formed through a wall of the first protrusion 85 in the depth direction (front-back direction) 53. In this embodiment, the opening 96 has a circular shape, but any other shapes are possible as well according to modified embodiments. The opening 96 has a dimension and size corresponding to the air communication opening 32 of the main body 31 and is in a position corresponding to the air communication opening 32, such that the air communication opening 32 is accessible via the opening 96 from the exterior of the ink cartridge 30 in the removal direction 55.

The bracket 90 has the opening 97 formed through the front wall 40 in the depth direction (front-back direction) 53, and the opening 97 is positioned at a lower portion of the front wall 40 with respect to the height direction 52. In this embodiment, the opening 97 has a circular shape, but any other shapes are possible as well according to modified embodiments. The opening 97 has a dimension and size corresponding to the ink supply portion 34 of the main body 31 and is in a position corresponding to the ink supply portion 34, such that the ink supply portion 34 extends through the opening 37 in the depth direction (front-back direction) 53.

The bracket 90 comprises the first protrusion 85 and the second protrusion 86 at the front wall 40. The first protrusion 85 extends from the upper end of the front wall 40 in the insertion direction 56 away from the rear wall 42. The width of the first protrusion 85 in the width direction (left-right direction) 51 is the same as the width of the front wall 40 in the width direction (left-right direction) 51. In another embodiment, the width of first protrusion 85 may be less than the width of the front wall 40. The front end of the first protrusion 85 is positioned more forward than the ink supply opening 71 formed at the distal end of the ink supply portion 34 in the insertion direction 56 away from the rear wall 42. The first protrusion 85 has a recess, e.g., a groove 87 formed in a middle portion of the first protrusion 85 with respect to the width direction (left-right direction) 52. The groove 87 extends in the depth direction (front-back direction) 53. The groove 87 is opened forward in the insertion direction 56 and opened upward in the height direction (up-down direction) 52. The both sides of the groove 87 with respect to the width direction (left-right direction) 51 are defined and closed by a pair of surfaces of the first protrusion 85, and the bottom of groove 87 is defined and closed by a surface of the first protrusion 85. The cross section of the groove 87 taken along the height direction (up-down direction) 52 and the width direction (left-right direction) 51 is rectangular.

The first protrusion 85 comprises the rib 88 disposed in a middle portion of the groove 87 with respect to the width direction (left-right direction) 51. The rib 88 extends in the depth direction (front-back direction) 53 and the height direction (up-down direction) 52. The rib 88 extends in the upward direction from the surface of the first protrusion 85 defining the bottom of the groove 87. The rib 88 is positioned at a top-wall 39 side of the ink cartridge 30. The rib 88 extends from the front wall 40 of the ink cartridge 30 in the depth direction 53 or insertion direction 56 at a boundary between the top wall 39 and the front wall 40. Each of side surfaces of the rib 88 with respect to the width direction (left-right direction) 51 extends in the depth direction (front-back direction) 53 and the height direction (up-down direction) 52 in parallel with the pair of surfaces of the first protrusion 85 defining the both sides of the groove 87 with respect to the width direction (left-right direction) 51. The surfaces of the first protrusion 85 defining the both sides of the groove 87 with respect to the width direction (left-right direction) 51 are opposed to the side surfaces of the rib 88 in the width direction (left-right direction) 52, respectively. The rib 88 is configured to attenuate light, e.g., visible or infrared light, traveling in a direction perpendicular to the insertion/removal direction 50. In this embodiment, the direction perpendicular to the insertion/removal direction 50 is the width direction (left-right direction) 51. More specifically, when the ink cartridge 30 is mounted to the cartridge mounting portion 110, the rib 88 is positioned between a light emitter and a light receiver of an optical sensor 116, which are aligned in a horizontal direction (the width direction or left-right direction 51) perpendicular to the insertion/removal direction 50. The rib 88 is configured to attenuate light, which is emitted from the light emitter of the optical sensor 116 and travels in the direction (the width direction or left-right direction 51) perpendicular to the insertion/removal direction 50. When the light reaches one side of the rib 88 in the direction (the width direction or left-right direction 51) perpendicular to the insertion/removal direction 50, the amount of light coming out of the other side of the rib 88 and reaching the light receiver of the optical sensor 116 is less than a predetermined amount, e.g., zero. In other words, the rib 88 is configured to attenuate the amount or the intensity of light to a level sufficient to be detected by the optical sensor 116. The attenuation of the light is caused by the rib 88 completely preventing the light from passing therethrough in the direction (the width direction or left-right direction 51) perpendicular to the insertion/removal direction 50, by the rib 88 absorbing some amount of the light, by the rib 88 deflecting the light, by the rib 88 totally reflecting the light, and etc. As such, the rib 88 can be detected by the optical sensor 116. The dimension of the rib 88 from the front wall 40 up to the front end of the rib 88 in the insertion direction 56 away from the rear wall 42 varies from one type of the ink cartridge 30 to another type of the ink cartridge 30. Different types of the ink cartridges 30 may comprise different colors of ink, different ingredients of ink such as dye and pigment, different initial amounts of ink stored in the ink chamber 36, and etc.

In another embodiment, the first protrusion 85 may have a recess 87 formed therein. The recess 87 may be opened forward in the insertion direction 56, opened upward in the height direction (up-down direction) 52, and opened on one side or the both sides of the first protrusion 85 in the width direction (left-right direction) 51

The second protrusion 86 extends from the lower end of the front wall 40 in the insertion direction 56 away from the rear wall 42. The second protrusion 86 is positioned below the ink supply portion 34. The width of the second protrusion 86 in the width direction (left-right direction) 51 is the same as the width of the front wall 40 in the width direction (left-right direction) 51. In another embodiment, the width of second protrusion 86 may be less than the width of the front wall 40. The front end of the second protrusion 86 is positioned more forward than the ink supply opening 71 formed at the distal end of the ink supply portion 34 in the insertion direction 56 away from the rear wall 42. The dimension of the second protrusion 86 from the front wall 40 up to the front end of the second protrusion 86 in the insertion direction 56 away from the rear wall 42 varies from one type of the ink cartridge 30 to another type of the ink cartridge 30. Different types of the ink cartridges 30 may comprise different colors of ink, different ingredients of ink such as dye and pigment, different initial amounts of ink stored in the ink chamber 36, and etc. In this embodiment, the second protrusion 86 is indirectly detected by an optical sensor 117 (see FIG. 1). In another embodiment, the second protrusion 86 may be directly detected by the optical sensor 117.

The bracket 90 comprises the detection portion 89 at or adjacent to the front wall 40 between the first protrusion 85 and the second protrusion 86 with respect to the height direction (up-down direction) 52. The detection portion 89 is positioned more forward than the detection portion 33 in the insertion direction 56 away from the rear wall 42. The detection portion 33 and the detection portion 89 are aligned in the insertion direction 56. The width of the detection portion 89 in the width direction (left-right direction) 51 is the same as the width of the detection portion 33 in the width direction (left-right direction) 51, but other larger or smaller widths are possible as well according to modified embodiments. The detection portion 89 is configured to attenuate light, e.g., visible or infrared light, traveling in the direction (the width direction or left-right direction 51) perpendicular to the insertion/removal direction 50 to pass therethrough. More specifically, during mounting of the ink cartridge 30 to the cartridge mounting portion 110, the detection portion 89 passes between the light emitter and the light receiver of the optical sensor 114. When this occurs, the detection portion 89 attenuates light, which is emitted from the light emitter of the optical sensor 114 and travels in the direction (the width direction or left-right direction 51) perpendicular to the insertion/removal direction 50. When the light reaches one side of the detection portion 89 in the direction (the width direction or left-right direction 51) perpendicular to the insertion/removal direction 50, the amount of light coming out of the other side of the detection portion 89 and reaching the light receiver of the optical sensor 114 is less than the predetermined amount, e.g., zero. In other words, the detection portion 89 is configured to attenuate the amount or the intensity of light to a level sufficient to be detected by the optical sensor 114. The attenuation of the light is caused by the detection portion 89 completely preventing the light from passing therethrough in the direction (the width direction or left-right direction 51) perpendicular to the insertion/removal direction 50, by the detection portion 89 absorbing some amount of the light, by the detection portion 89 deflecting the light, by the detection portion 89 totally reflecting the light, and etc. As such, the detection portion 89 can be detected by the optical sensor 114.

There is a gap between the detection portion 89 and the detection portion 33 in the depth direction (front-back direction) 53. During mounting of the ink cartridge 30 to the cartridge mounting portion 110, the light, which is emitted from the light emitter of the optical sensor 114 and travels in the direction (the width direction or left-right direction 51) perpendicular to the insertion/removal direction 50, passes through the gap and reaches the light receiver of the optical sensor 114. The amount of light coming out of the gap and reaching the light receiver of the optical sensor 114 is greater than or equal to the predetermined amount. The dimension of the detection portion 89 in the depth direction (front-back direction) 53 varies from one type of the ink cartridge 30 to another type of the ink cartridge 30. Different types of the ink cartridges 30 may comprise different colors of ink, different ingredients of ink such as dye and pigment, different initial amounts of ink stored in the ink chamber 36, and etc.

The front end of the first protrusion 85, the front end of the second protrusion 86, and the detection portion 89 are positioned more forward than the detection portion 33 with respect to the insertion direction 56. In other words, the detection portion 33 is positioned more rearward than the front end of the first protrusion 85, the front end of the second protrusion 86, and the detection portion 89 with respect to the insertion direction 56. Each of the detection portion 33 and the ink supply opening 71 is positioned between the first protrusion 85 and the second protrusion 86 with respect to the height direction 52.

The ink cartridge 30 comprises a guide portion 65 at the top wall 39. The guide portion 65 is a pair of ribs extending upward from the top wall 39 and extending in the depth direction (front-back direction) 53. The guide portion 65 extends over the bracket 90 and the main body 31. The width of the guide portion 65 between the outer surfaces of the ribs in the width direction (left-right direction) is less than the width of the ink cartridge 30 between the outer surfaces of the side walls 37, 38 of the main body 31 and the bracket 90 in the width direction (left-right direction). The inner gap of the guide portion 65 between the inner surfaces of the ribs in the width direction (left-right direction) is greater than the width of the engagement member 145 in the width direction (left-right direction). The guide portion 65 comprises a front end in the insertion direction 56. The guide portion 65 is positioned between the groove 87 of the first protrusion 85 and the rear wall 42. More specifically, the guide portion 65 is positioned in the rear of the groove 87 with respect to the insertion direction 56.

The ink cartridge 30 comprises a guide portion 66 at the bottom wall 41. The guide portion 66 is a protrusion extending downward from the bottom wall 41 and extending in the depth direction (front-back direction) 53. The guide portion 66 extends over the bracket 90 and the main body 31. The width of the guide portion 66 between the outer surfaces of the guide portion 66 in the width direction (left-right direction) is less than the width of the ink cartridge 30 between the outer surfaces of the side walls 37, 38 of the main body 31 and the bracket 90 in the width direction (left-right direction). When the ink cartridge 30 is inserted into and removed from the cartridge mounting portion 110, the guide portions 65, 66 are inserted in guide grooves 109 of the cartridge mounting portion 110.

The ink cartridge 30 comprises an IC board 74 disposed at the bracket 90 between the pair of ribs of the guide portion 65. The IC board 74 is positioned between the groove 87 of the first protrusion 85 and the rear wall 42 and between the engagement portion 45 and the front wall 40. The IC board 74 is positioned at the top-wall 39 side of the ink cartridge 30 between the front wall 40 and the rear wall 42. The IC board 74 is positioned more rearward than the front wall 40 and the groove 87 with respect to the insertion direction 56. The IC board 74 and the ink supply opening 71 are shifted with respect to the insertion direction 56. More specifically, the IC board 74 is positioned more rearward than the ink supply opening 71 with respect to the insertion direction 56.

The bracket 90 comprises a platform 67 on which the IC board 74 is disposed.

The platform 67 is positioned between the pair of ribs of the guide portion 65. The platform 67 is a planar surface extending in the width direction (left-right direction) 51 and the depth direction (front-back direction) 53, and extending in the insertion/removal direction 50 when the ink cartridge 30 is in the mounted position (upright position). A plane on which the platform 67 extends, i.e., a plane extending in the depth direction (front-back direction) 53 and the width direction (left-right direction) 51, intersects a plane on which the engagement surface 46 extends, i.e., a plane extending in the height direction (up-down direction) 52 and the width direction (left-right direction) 51. In this embodiment, the plane on which the platform extends is perpendicular to the plane on which the engagement surface 46 extends. The IC board 74 comprises an upper surface extending in the width direction (left-right direction) 51 and the depth direction (front-back direction) 53. When the ink cartridge 30 is in the mounted position (upright position), the upper surface of the IC board 74 extends horizontally and faces upward. A plane on which the upper surface of the IC board 74 extends, i.e., a plane extending in the depth direction (front-back direction) 53 and the width direction (left-right direction) 51, intersects the plane on which the engagement surface 46 extends, i.e., a plane extending in the height direction (up-down direction) 52 and the width direction (left-right direction) 51. In this embodiment, the plane on which the upper surface of the IC board 74 extends is perpendicular to the plane on which the engagement surface 46 extends. Because the platform 67 is positioned more forward than the engagement surface 46 with respect to the insertion direction 56, the IC board 74 is positioned more forward than the engagement surface 46 with respect to the insertion direction 56. The IC board 74 is positioned above (higher than) the rib 88 and the groove 87 of the first protrusion 85 with respect to the height direction (up-down direction) 52. In other word, the IC board 74 is positioned more outside than the rib 88 and the groove 87. The IC board 74 is positioned above (higher than) at least a portion of the engagement portion 45 with respect to the height direction (up-down direction) 52. In other words, the IC board 74 is positioned more outside than at least a portion of the engagement portion 45. The cartridge mounting portion 110 comprises three contacts 106 aligned in the direction (width direction or left-right direction 51) perpendicular to the insertion/removal direction 50. During mounting of the ink cartridge 30 to the cartridge mounting portion 110, the IC board 74 contacts and is electrically connected to the three contacts 106 (see FIG. 6). When the mounting of the ink cartridge 30 to the cartridge mounting portion 110 is completed, the IC board 74 still contacts and is electrically connected to the three contacts 106.

Referring to FIGS. 2 and 3, the IC board 74 comprises an IC (not shown), and electrical interfaces, e.g., a HOT electrode 75, a GND electrode 76, and a signal electrode 77. The IC is a semiconductor integrated circuit and stores data about the information of the ink cartridge 30, e.g., the lot number of the ink cartridge 30, the manufacturing date of the ink cartridge 30, the color of ink stored in the ink cartridge 30, and etc. When the ink cartridge 30 is mounted to the cartridge mounting portion 110, the data stored in the IC can be read out by the printer 10.

Each of the HOT electrode 75, the GND electrode 76, and the signal electrode 77 is electrically connected to the IC. Each of the HOT electrode 75, the GND electrode 76, and the signal electrode 77 extends in the depth direction (front-back direction) 53. The HOT electrode 75, the GND electrode 76, and the signal electrode 77 are aligned and spaced apart from each other in the width direction (left-right direction) 51. The GND electrode 76 is positioned between the HOT electrode 75 and the signal electrode 77. The IC board 74 has a width in the width direction (left-right direction) 51 and the rib 88 of the first protrusion 85 has a width in the width direction (left-right direction) 51, and the width of the IC board 74 is greater than the width of the rib 88. Each of the HOT electrode 75, the GND electrode 76, and the signal electrode 77 has a width in the width direction (left-right direction) 51, and the width of each of the HOT electrode 75, the GND electrode 76, and the signal electrode 77 is greater than the width of the rib 88. The center of the IC board 74 in the width direction (left-right direction) 51 and the center of the rib 88 of the first protrusion 85 in the width direction (left-right direction) is positioned on a plane which is parallel with the height direction (up-down direction) 52 and the depth direction (front-back direction) 53. Therefore, the IC board 74 and the rib 88 intersect the plane which is parallel with the height direction (up-down direction) 52 and the depth direction (front-back direction) 53. In other words, the IC board 74 and the rib 88 are not offset in the width direction (left-right direction) 51. More specifically, the center of the GND electrode 76 in the width direction (left-right direction) 51 and the center of the rib 88 is positioned on the plane which is parallel with the height direction (up-down direction) 52 and the depth direction (front-back direction) 53. In other words, the center of the GND electrode 76 in the width direction (left-right direction) 51 and the center of the rib 88 are not offset in the width direction (left-right direction) 51. Therefore, the GND electrode 76 and the rib 88 intersect the plane which is parallel with the height direction (up-down direction) 52 and the depth direction (front-back direction) 53. In other words, the GND electrode 76 and the rib 86 are not offset in the width direction (left-right direction) 51. The HOT electrode 75, the GND electrode 76, the signal electrode 77, and the rib 88 are symmetrically arranged with respect to the plane which is parallel with the height direction (up-down direction) 52 and the depth direction (front-back direction) 53. The engagement surface 46, the IC board 74, and the groove 87 intersect the plane which is parallel with the height direction (up-down direction) 52 and the depth direction (front-back direction) 53. In other words, the engagement surface 46, the IC board 74, and the groove 87 are not offset in the width direction (left-right direction) 51. More specifically, the engagement surface 46, the GND electrode 76, and the groove 87 intersect the plane which is parallel with the height direction (up-down direction) 52 and the depth direction (front-back direction) 53, the engagement surface 46, the HOT electrode 75, and the groove 87 intersect another plane which is parallel with the height direction (up-down direction) 52 and the depth direction (front-back direction) 53, and the engagement surface 46, the signal electrode 77, and the groove 87 intersect yet another plane which is parallel with the height direction (up-down direction) 52 and the depth direction (front-back direction) 53. In other words, the engagement surface 46, each one of the HOT electrode 75, the GND electrode 76, and the signal electrode 77, and the groove 87 are not offset in the width direction (left-right direction) 51. During mounting of the ink cartridge 30 to the cartridge mounting portion 110, the HOT electrode 75, the GND electrode 76, and the signal electrode 77 contact and are electrically connected to the three contacts 106 (see FIG. 6), respectively. When the mounting of the ink cartridge 30 to the cartridge mounting portion 110 is completed, the HOT electrode 75, the GND electrode 76, and the signal electrode 77 still contact and are electrically connected to the three contacts 106, respectively.

The engagement surface 46, the IC board 74, and the groove 87 are exposed upward with respect to the height direction 52 to the exterior of the ink cartridge 30 at the top-wall 39 side of the ink cartridge 30. The HOT electrode 75, the GND electrode 76, and the signal electrode 77 are exposed upward to the exterior of the ink cartridge 30 at the upper surface of the IC board 74, such that the HOT electrode 75, the GND electrode 76, and the signal electrode 77 are accessible from above when the ink cartridge 30 is in the mounted position. In other words, the HOT electrode 75, the GND electrode 76, and the signal electrode 77 are accessible in the downward direction which is perpendicular to the width direction (left-right direction) 51 and the insertion/removal direction 50. The engagement surface 46 is accessible from above when the ink cartridge 30 is in the mounted position. In other words, the engagement surface 46 is accessible in the downward direction which is perpendicular to the width direction (left-right direction) 51 and the insertion/removal direction 50.

The pair of ribs of the guide portion 65 extends beyond the IC board 74 upward and forward in the insertion direction 56. In other words, the pair of ribs of the guide portion 65 extend outward beyond the IC board 74. The bracket 90 comprises a ramp 49 connecting the pair of ribs of the guide portion 65. The ramp 49 is positioned between the groove 87 of the first protrusion 85 and the rear wall 42 and between the IC board 74 and the front wall 40. The ramp 49 is positioned between the groove 87 of the first protrusion 85 and the IC board 74. The ramp 49 is inclined downward with respect to the insertion direction 56, such that a front portion of the ramp 49 is positioned lower than a rear portion of the ramp 49. When the ink cartridge 30 is inserted into and/or removed from the cartridge mounting portion 110, the engagement member 145 slides on the ramp 49.

A recess 78 is formed between the engagement portion 45 and the bracket 90 at a boundary between the engagement portion 45 and the bracket 90 at an upper portion of the ink cartridge 30. When the main body 31 and the bracket 90 are positioned relative to the cartridge mounting portion 110, respectively, as described below, there is no level difference between the engagement portion 45 and the bracket 90 in the height direction (up-down direction) 50 on both sides of the recess 78. Therefore, when the ink cartridge 30 is inserted into or removed from the cartridge mounting portion 110, the engagement member 145 is not caught in the recess 78.

Figure 10B:
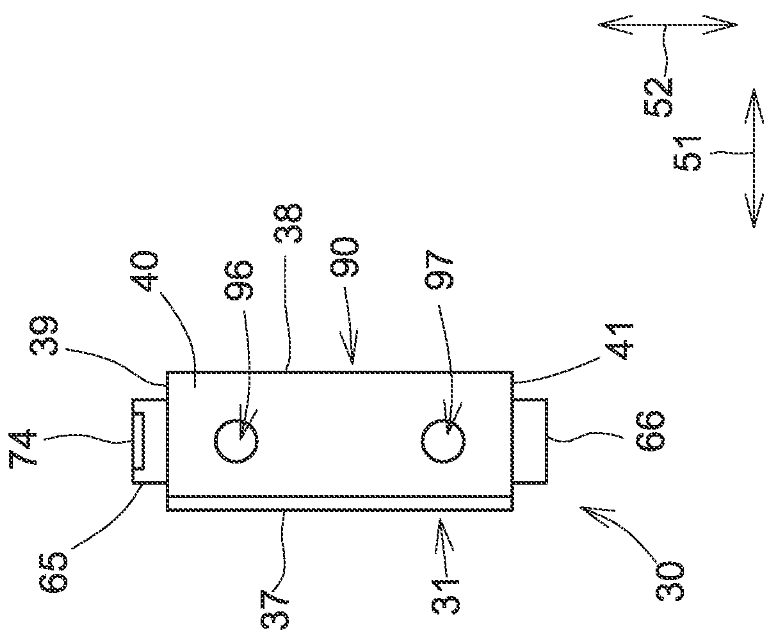
FIG. 10B is a front view of the ink cartridge of FIG. 10A.
Figure 10A:
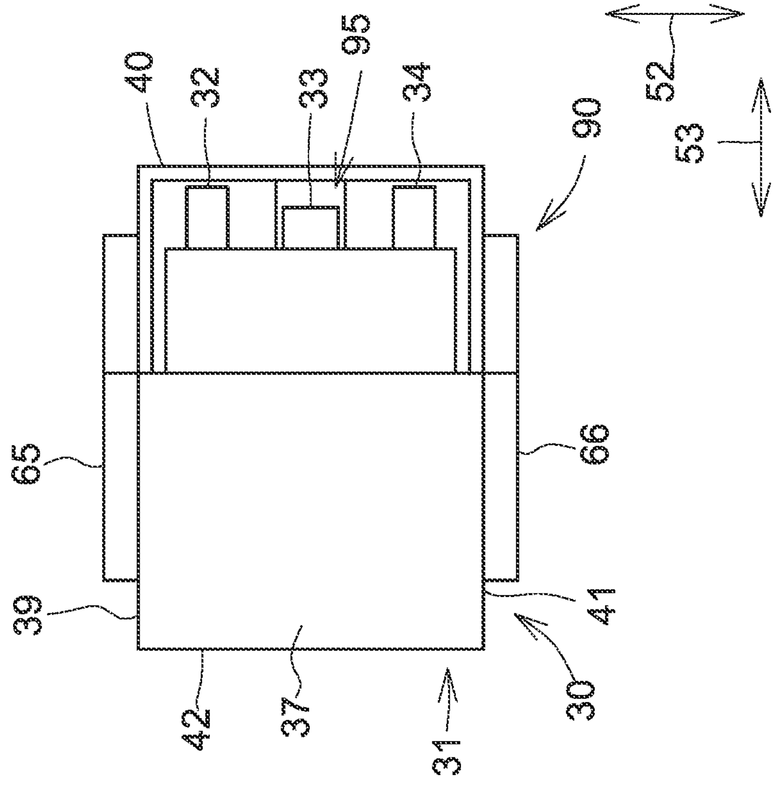
FIG. 10A is a side view of an ink cartridge, according to a modified embodiment.
Figure 11B:
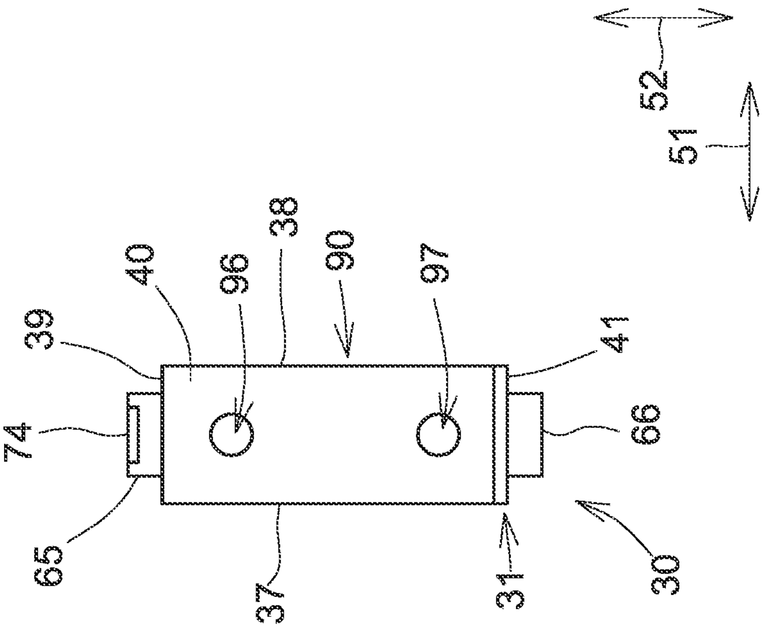
FIG. 11B is a front view of the ink cartridge of FIG. 11A.
Figure 11A:
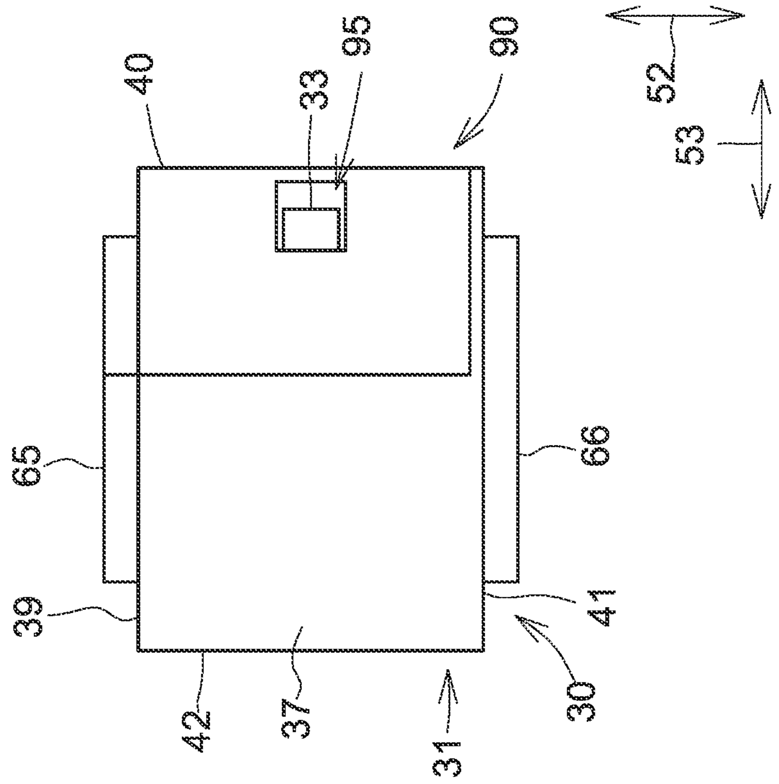
FIG. 11A is a side view of an ink cartridge, according to another modified embodiment.

In this embodiment, the bracket 90 covers the front face of the main body 31, the side-wall 37 side of the front portion of the main body 31, the side-wall 38 side of the front portion of the main body 31, the top-wall 39 side of the front portion of the main body 31, and the bottom-wall 41 side of the front portion of the main body 31. However, the bracket 90 may cover the front portion of the main body 31 differently. Referring to FIGS. 10A and 10B, in a modified embodiment, the bracket 90 may not cover the side-wall 37 side of the front portion of the main body 31. Referring to FIGS. 11A and 111B, in another modified embodiment, the bracket 90 may not cover the bottom-wall 41 side of the front portion of the main body 31.

[Ink supply device 100]

Referring to FIG. 1, the printer 10 comprises the ink supply device 100. The ink supply device 100 is configured to supply ink to the print head 21. The ink supply device 100 comprises the cartridge mounting portion 110 to which the ink cartridge 30 is mountable. In FIG. 1, the ink cartridge 30 is mounted to the cartridge mounting portion 110.

[Cartridge mounting portion 110]

Figure 5:
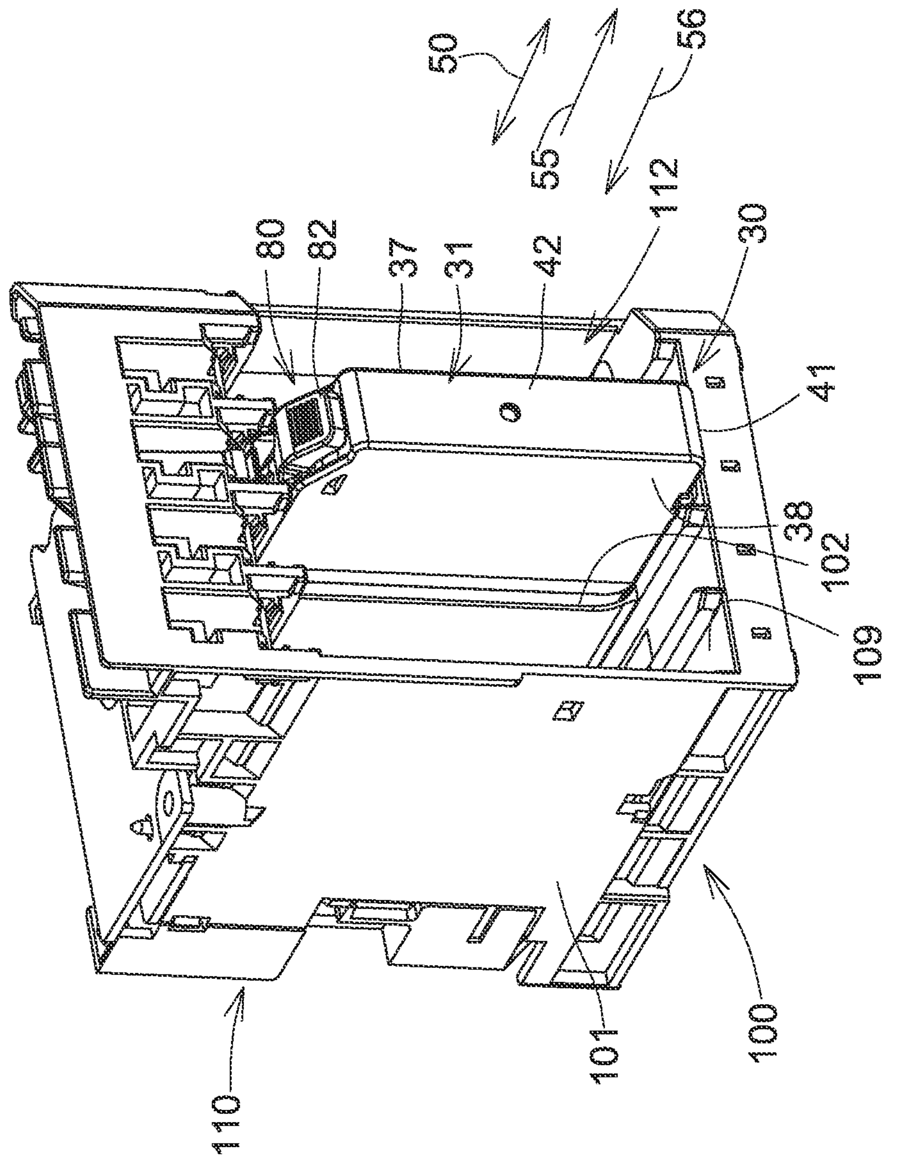
FIG. 5 is a perspective view of the cartridge mounting portion and the ink cartridge.
Figure 6:
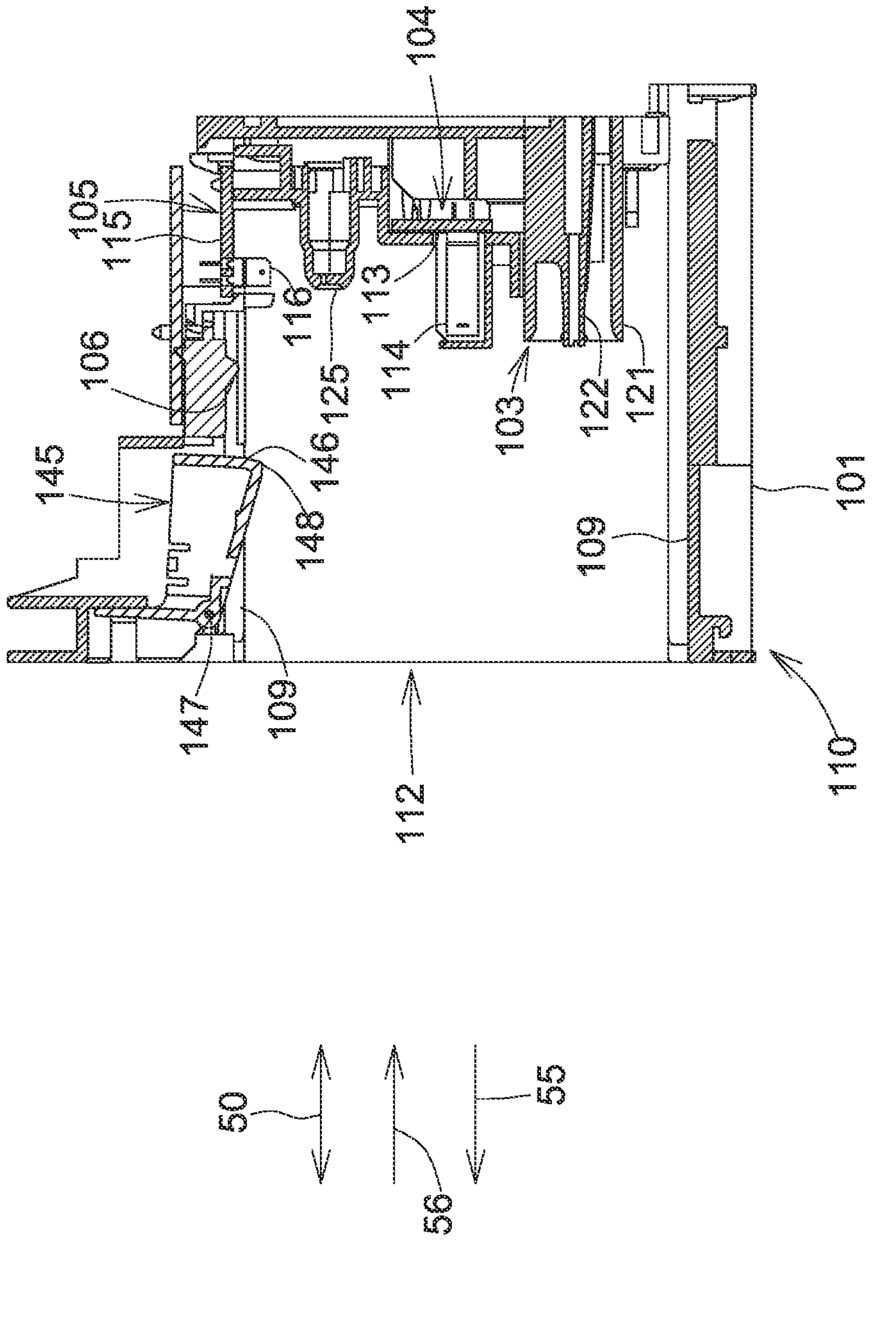
FIG. 6 is a vertical, cross-sectional view of the cartridge mounting portion.

Referring to FIGS. 5 and 6, the cartridge mounting portion 110 comprises a case 101, and the case 101 has the opening 112 formed through one face of the case 101. The ink cartridge 30 is configured to be inserted into or removed from the case 101 through the opening 112. The case 101 has the groove 109 formed in a top surface defining the upper end of the inner space of the case 101 and also has the groove 109 formed in a bottom surface defining the lower end of the inner space of the case 101. The grooves 109 extend in the insertion/removal direction 50. The ink cartridge 30 is guided in the insertion/removal direction 50 with the guide portion 65 inserted in the groove 109 formed in the top surface of the case 101 and the guide groove 66 inserted in the groove 109 formed in the bottom surface of the case 101. The case 101 is configured to receive four ink cartridges 30 storing cyan ink, magenta ink, yellow ink, and black ink, respectively.

The case 101 comprises three partition plates 102 extending in the vertical direction and the insertion/removal direction 50. The three partition plates 102 partition the inner space of the case 101 into four spaces. The four ink cartridges 30 are configured to be mounted in the four spaces, respectively.

Referring to FIG. 6, the case 101 comprises an end surface opposite the opening 112 in the insertion/removal direction 50. The cartridge mounting portion 110 comprises a connection portion 103 provided at a lower portion of the end surface of the case 101 at a position corresponding to the ink supply portion 34 of the ink cartridge 30 mounted to the case 101. In this embodiment, four connection portions 103 are provided for the four ink cartridges 30 mountable to the case 101.

The connection portion 103 comprises a printing fluid supply pipe, e.g., the ink pipe 122, and a holding portion 121. The ink pipe 122 is a cylindrical pipe made of a synthetic resin. The ink pipe 122 is connected to the ink tube 20 at the exterior of the case 101. The ink tube 20 connected to the ink pipe 20 extends to the printing head 21 to supply ink to the printing head 21. In FIGS. 5 and 6, the ink tube 20 is not depicted.

Figure 9:
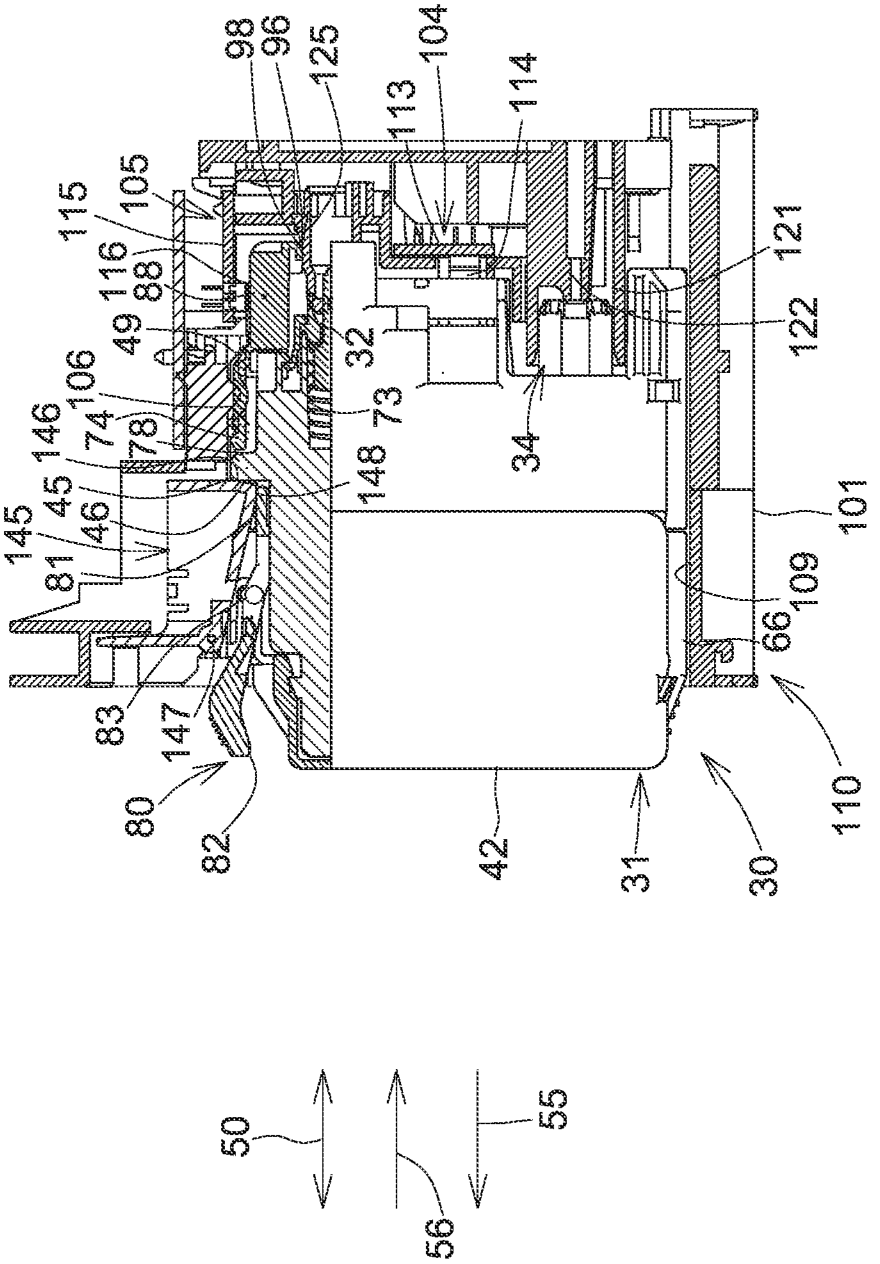
FIG. 9 is a vertical, partial cross-sectional view of the cartridge mounting portion and the ink cartridge, in which the mounting of the ink cartridge to the cartridge mounting portion is completed.

The holding portion 121 has a cylindrical shape. The ink pipe 122 is positioned at the center of the holding portion 121. Referring to FIG. 9, when the ink cartridge 30 is mounted to the cartridge mounting portion 110, the ink supply portion 34 is inserted into the holding portion 121. When this occurs, the ink supply portion 34 is positioned relative to the holding portion 121 with respect to the height direction (up-down direction) 52 by an outer surface of the ink supply portion 34 contacting an inner surface of the holding portion 121. When the ink supply portion 34 is inserted into the holding portion 121, the ink pipe 122 is inserted into the ink supply opening 71. This allows ink stored in the ink chamber 36 to flow out into the ink pipe 122.

Referring to FIG. 6, the cartridge mounting portion 110 comprises a senor unit 104 above the connection portion 103. The sensor unit 104 comprises a board 113 and the optical senor 114 mounted to the board 113. More specifically, the sensor unit 104 comprises one board 113 and four optical sensors 114 mounted to the one board 113, corresponding to the four ink cartridges 30 mountable to the case 101.

As described above, the optical sensor 114 comprises the light emitter, e.g., a light emitting diode, and the light receiver, e.g., a photo-transistor. The light emitter and the light receiver are housed in a housing, and the housing extends from the board 113 in the insertion/removal direction 50 toward the opening 112. The housing has substantially a U-shape when view from the above. The light emitter and the light receiver of the optical sensor 114 are aligned in a horizontal direction (the width direction or left-right direction 51) perpendicular to the insertion/removal direction 50 with a space formed therebetween. The light emitter is configured to emit light, e.g., infrared or visible light, toward the light receiver in the horizontal direction (the width direction or left-right direction 51) perpendicular to the insertion/removal direction 50, and the light receiver is configured to receive the light emitted from the light emitter. The detection portion 33 and the detection portion 89 can be inserted into the space between the light emitter and the light receiver. The optical sensor 114 is configured to detect the change in the amount (intensity) of the light when the detection portion 33 or the detection portion 89 enters an optical path (detection point) formed between the light emitter and the light receiver. The optical sensor 114 is electrically connected to a controller (described later) of the printer 10, and when the optical sensor 114 detects the detection portion 33 or the detection portion 89, a signal output from the optical sensor 114 to the controller changes.

Referring to FIG. 6, the cartridge mounting portion 110 comprises a senor unit 105 positioned at the top surface of the case 101 adjacent to the end surface of the case 101. The sensor unit 105 comprises a board 115 and the optical sensor 116 mounted to the board 115. More specifically, the sensor unit 105 comprises one board 115 and four optical sensors 116 mounted to the one board 115, corresponding to the four ink cartridges 30 mountable to the case 101.

As described above, the optical sensor 116 comprises the light emitter, e.g., a light emitting diode, and the light receiver, e.g., a photo-transistor. The light emitter and the light receiver are housed in a housing, and the housing extends from the board 115 downward in the vertical direction. The housing has substantially an up-side-down U-Shape when viewed in the insertion/removal direction 50.

The light emitter and the light receiver of the optical sensor 116 are aligned in the horizontal direction (the width direction or left-right direction 51) perpendicular to the insertion/removal direction 50 with a space formed therebetween. The light emitter is configured to emit light, e.g., infrared or visible light, toward the light receiver in the horizontal direction (the width direction or left-right direction 51) perpendicular to the insertion/removal direction 50, and the light receiver is configured to receive the light emitted from the light emitter. When the ink cartridge 30 is mounted to the cartridge mounting portion 110, the rib 88 of the first protrusion 85 is inserted into the space between the light emitter and the light receiver. The optical sensor 116 is configured to detect the change in the amount (intensity) of the light when the rib 88 enters an optical path (detection point) formed between the light emitter and the light receiver. The optical sensor 116 is electrically connected to the controller of the printer 10, and when the optical sensor 116 detects the rib 88, a signal output from the optical sensor 116 to the controller changes. Based on the signal change, whether the ink cartridge 30 is mounted to the cartridge mounting portion 110 can be determined by the controller. In other words, the rib 88 is configured to provide information as to the presence of the ink cartridge 30 in the cartridge mounting portion 110 by attenuating the light of the optical sensor 116.

The cartridge mounting portion 110 comprises electrical contacts 106 positioned at the top surface of the case 101 between the end surface of the case 101 and the opening 112. Three contacts 106 are provided and aligned in the direction (width direction or left-right direction 51) perpendicular to the insertion/removal direction 50. Three contacts 106 are arranged at positions corresponding to the HOT electrode 75, the GND electrode 76, the signal electrode 77 of the ink cartridge 30. The contacts 106 have electrical conductivity and resiliency. The contacts 106 are configured to be resiliently deformed in the upward direction. Four sets of three contacts 106 are provided, corresponding to the four ink cartridges 30 mountable to the case 101.

The printer 10 comprises the controller, and the contacts 106 are electrically connected to the controller via an electrical circuit. The controller may comprise a CPU, a ROM, a RAM, and etc. When the HOT electrode 75 contacts and is electrically connected to a corresponding one of the contacts 106, a voltage Vc is applied to the HOT electrode 75. When the GND electrode 76 contacts and is electrically connected to a corresponding one of the contacts 106, the GND electrode 76 is grounded. When the HOT electrode 75 and the GND electrode 76 contact and are electrically connected to the corresponding contacts 106, respectively, power is supplied to the IC. When the signal electrode 77 contacts and is electrically connected to a corresponding one of the contacts 106, data stored in the IC is accessible. Outputs from the electrical circuit are input to the controller.

Referring to FIG. 1, the case 101 has a space 130 formed at the lower end of the end surface of the case 101. The cartridge mounting portion 110 comprises a slider 135 disposed in the space 130. Four sliders 135 are provided corresponding to the four ink cartridges 30 mountable to the case 101. The space 130 is contiguous with the inner space of the case 101. The slider 135 is configured to move in the space 130 in the insertion/removal direction 50. The slider 135 has substantially a rectangular parallelepiped shape. The slider 135 is positioned in the line of travel of the second protrusion 86 of the ink cartridge 30 and is configured to contact the second protrusion 86.

The cartridge mounting portion 110 comprises a coil spring 139 disposed in the space 130. The coil spring 139 is configured to bias the slider 135 toward the opening 112, i.e., in the removal direction 55. When the coil spring 139 is in a normal length, i.e., when no external force is applied to the slider 135, the slider 135 is positioned at an opening 112 side of the space 130. When the ink cartridge 30 is inserted into the case 101, the second protrusion 86 of the ink cartridge 30 contacts the slider 135 and pushes the slider 135 in the insertion direction 56. When this occurs, the coil spring 139 contracts and the slider 135 slides in the insertion direction 56. The coil spring 139 in a contracted state biases the ink cartridge 30 in the removal direction 55 via the slider 135.

The cartridge mounting portion 110 comprises the optical sensor 117 at an upper portion of the space 130. Four optical sensors 117 are provided corresponding to the four ink cartridges 30 mountable to the case 101. In other words, the four optical sensors 117 are provided corresponding to the four sliders 135. The four optical sensors 117 are aligned in the direction (width direction or left-right direction 51) perpendicular to the insertion/removal direction 50. The optical sensor 117 has the same structure as the optical sensor 116.

When the ink cartridge 30 is mounted to the case 101, the slider 135 is pushed and inserted into a space between a light emitter and a light receiver of the optical sensor 117. The optical sensor 117 is configured to detect the change in the amount (intensity) of light when the slider 135 enters an optical path (detection point) formed between the light emitter and the light receiver of the optical sensor 117. The optical sensor 117 is electrically connected to the controller of the printer 10, and when the optical sensor 117 detects the slider 135, a signal output from the optical sensor 117 to the controller changes. In FIGS. 6 to 9, the slider 135, the coil spring 139, and the optical sensor 117 are not depicted.

In the cartridge mounting portion 110, the detection point (optical path) of the optical sensor 114 is positioned more rearward than the detection point (optical path) of the optical sensor 116 and the detection point (optical path) of the optical sensor 117 in the insertion direction 56.

Referring to FIG. 6, the cartridge mounting portion 110 comprises a rod 125 at the end surface of the case 101. The position of the rod 125 with respect to the height direction (up-down direction) 52 corresponds to the position of the air communication valve 73 of the ink cartridge 30 mounted to the cartridge mounting portion 110 with respect to the height direction (up-down direction) 52. Four rods 125 are provided corresponding to the four ink cartridges 30 mountable to the case 101. The rod 125 has a cylindrical shape and extends from the end surface of the case 101 in the insertion/removal direction 50 toward the opening 112. During the mounting of the ink cartridge 30 to the cartridge mounting portion 110, the rod 125 is inserted through the opening 96 of the bracket 90, and the distal end of the rod 125 contacts the air communication valve 73. The air communication valve 73 is pushed by the rod 125, such that the air communication opening 32 is opened. An outer surface of the rod 125 contacts an inner surface 98 of the bracket 90 defining the opening 96, and thereby the bracket 90 is positioned relative to the cartridge mounting portion 110 with respect to the height direction (up-down direction) 52.

Referring to FIG. 6, the cartridge mounting portion 110 comprises the engagement member 145 positioned at an upper portion of the case 101. The engagement member 145 is configured to retain the ink cartridge 30 in the mounted position. The engagement member 145 is positioned adjacent to the upper end of the opening 112. The engagement member 145 is positioned between the opening 112 and the contacts 106. Each of the contacts 106 and the engagement member 145 intersect a plane which is parallel with the insertion/removal direction 50 and the vertical (gravitational) direction. In other words, each of the contacts 106 and the engagement member 145 are not offset in the width direction (left-right direction) 51. Four engagement members 145 are provided corresponding to the four ink cartridges 30 mountable to the case 101.

The cartridge mounting portion 110 comprises a shaft 147 positioned adjacent to the upper end of the opening 112. The shaft 147 is attached to the case 101 and extends in the direction (width direction or left-right direction 51) perpendicular to the insertion/removal direction 50. The shaft 147 extends through an end of the engagement member 145 adjacent to the opening 112, in other words, a rear end of the engagement member 145 with respect to the insertion direction 56. The engagement member 145 is supported by the shaft 147, such that the engagement member 145 can pivot about the shaft 147 selectively toward and away from the inner space of the case 101. The engagement member 145 comprises an engagement end 146 opposite the end of the engagement member 145 through which the shaft 147 extends. In other words, the engagement end 146 is positioned at a front end of the engagement member 145 with respect to the insertion direction 56. The engagement end 146 is configured to contact the engagement portion 45 of the ink cartridge 30. By the contact between the engagement end 146 and the engagement surface 46 of the engagement portion 45, the ink cartridge 30 is retained in the mounted position in the case 101 against the biasing force from the slider 135. When the engagement end 146 contacts the engagement surface 46, the engagement end 146 extends substantially in the width direction (left-right direction) 51 and the height direction (up-down direction) 52. The engagement member 145 is configured to move between a lock position and an unlock position. When the engagement member 145 is in the lock position, the engagement end 146 can contact the engagement portion 45. When the engagement member 145 is in the unlock position, the engagement end 146 cannot contact the engagement portion 45.

The engagement member 145 comprises a slide surface 148 extending from the engagement end 146 toward the shaft 147. When the engagement end 146 contacts the engagement surface 46, the slide surface 148 extends substantially in the width direction (left-right direction) 51 and the depth direction (front-back direction) 53. The slide surface 148 has a width in the width direction (left-right direction) 51, such that the slide surface 148 contacts and slides on all the HOT electrode 75, the GND electrode 76, and the signal electrode 77 at the same time when the ink cartridge 30 is inserted into and/or removed from the cartridge mounting portion 110.

The engagement member 145 is configured to pivot downward due to its own weight or biased by a spring (not shown). When the ink cartridge 30 is mounted to the cartridge mounting portion 110, the engagement end 146 contacting the engagement portion 45 is positioned above the front end portion 81 of the pivot member 80. When the front end portion 81 moves upward and pushes up the engagement end 146, the engagement member 145 pivots upward about the shaft 147 from the lock position to the unlock position.

The movable range of the engagement member 145 is limited, such that the engagement member 145 does not pivot downward beyond the lock position.

[Mounting of ink cartridge 30 to cartridge mounting portion 110]

Figure 7:
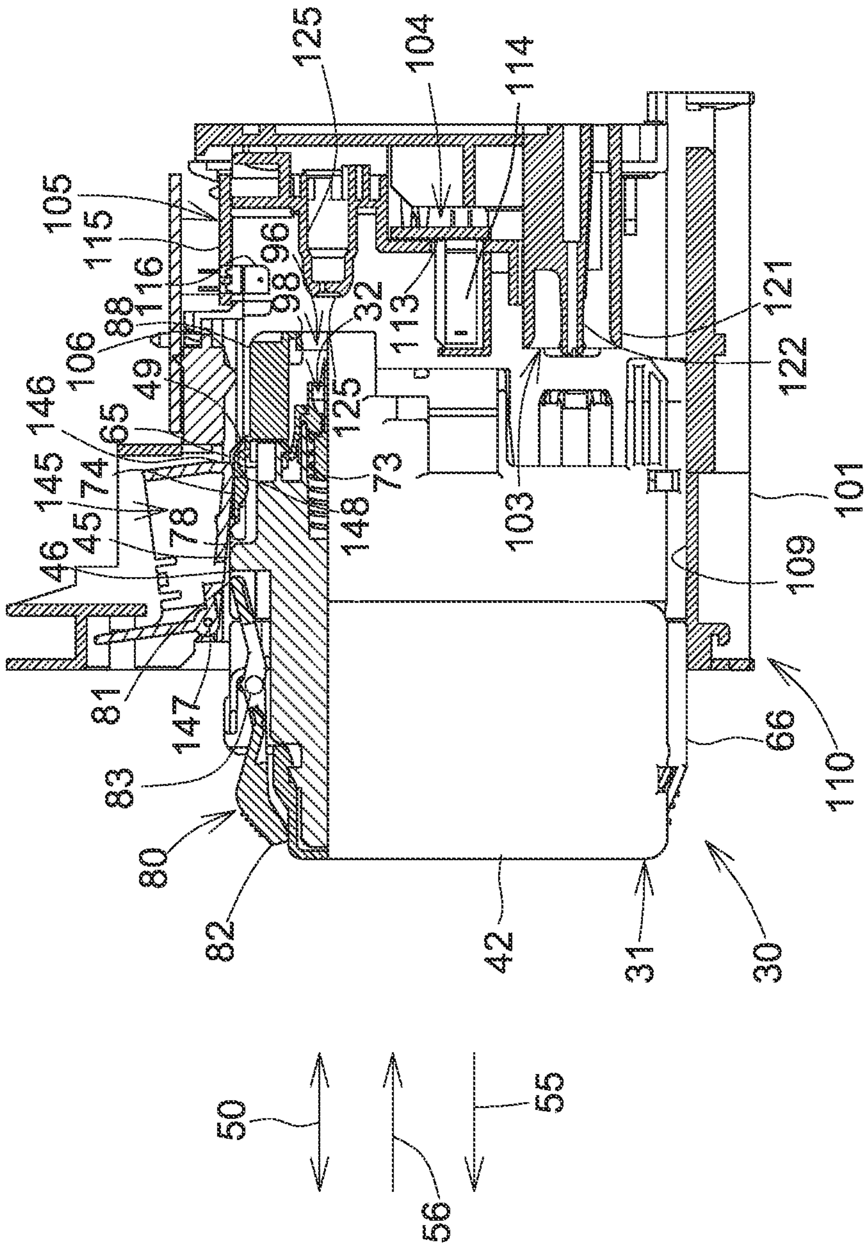
FIG. 7 is a vertical, partial cross-sectional view of the cartridge mounting portion and the ink cartridge during mounting of the ink cartridge to the cartridge mounting portion.
Figure 8:
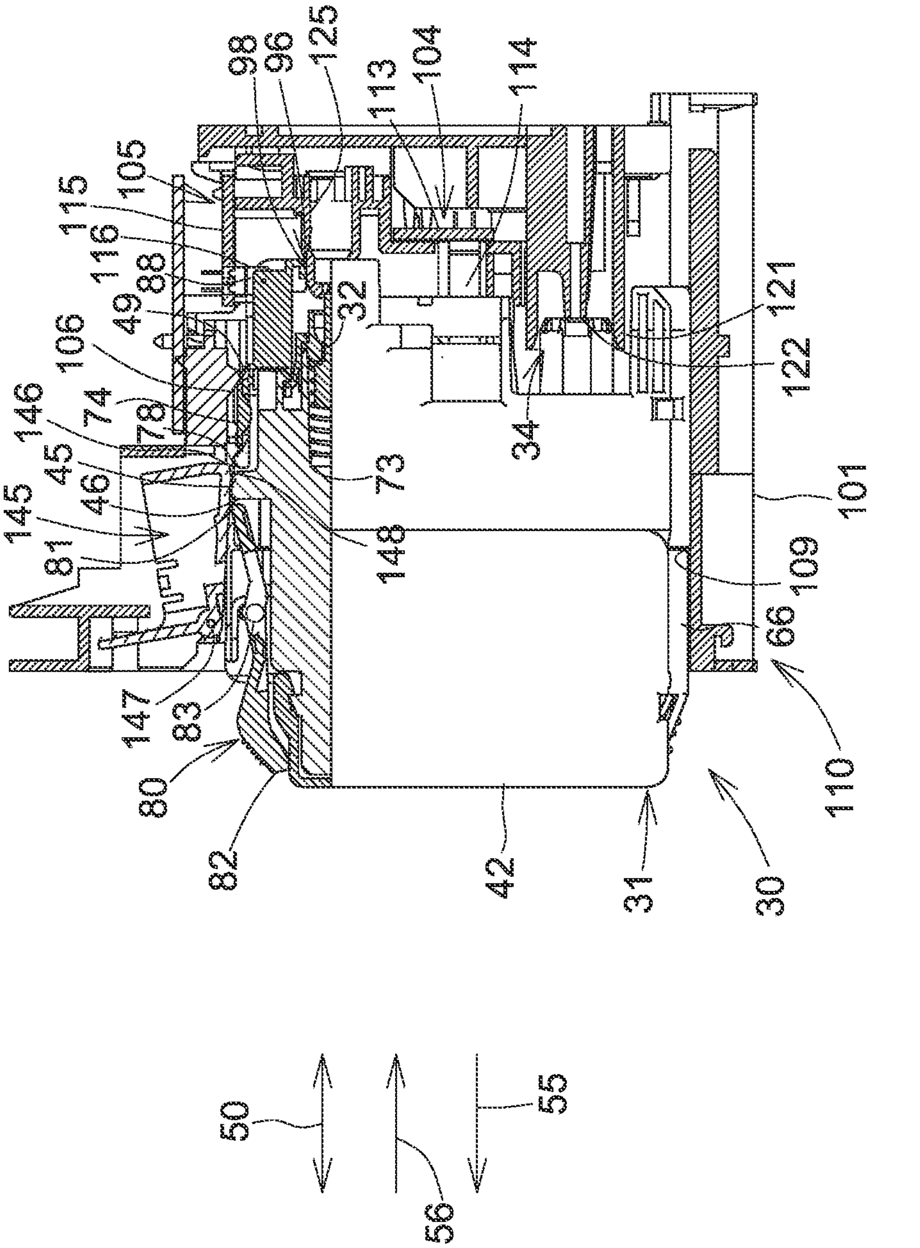
FIG. 8 is another vertical, partial cross-sectional view of the cartridge mounting portion and the ink cartridge during mounting of the ink cartridge to the cartridge mounting portion.

Referring to FIGS. 7 to 9, it is described how the ink cartridge 30 is mounted to the cartridge mounting portion 110. In FIGS. 7 to 9, the cartridge mounting portion 110 is depicted in cross-section, but only a top-wall 39 side portion of the ink cartridge 30 is depicted in cross-section.

As described above, because the bracket 90 is supported by the upper surface of the front portion of the main body 31 from below, the bracket 90 is movable in the upward direction relative to the main body 31 before the ink cartridge 30 is mounted to the cartridge mounting portion 110. Referring to FIG. 7, when the ink cartridge 30 is inserted into the cartridge mounting portion 110 in the insertion direction 56, the guide portions 65, 66 of the ink cartridge 30 are inserted into the grooves 109 of the case 101, and thereby the ink cartridge 30 is roughly positioned relative to the cartridge mounting portion 110 with respect to the width direction (left-right direction) 51 and the height direction (up-down direction) 52. The ink cartridge 30 is configured to slide toward the end surface of the case 101 while the guide portions 65, 66 are inserted in the grooves 109.

Referring to FIGS. 7 and 8, when the ink cartridge 30 is inserted into the case 101, the front end of the first protrusion 85 contacts the slide surface 148 of the engagement member 145. When the ink cartridge 30 is further inserted, the slide surface 148 climbs onto the first protrusion 85 and the ramp 49. When this occurs, the engagement member 145 pivots upward in the counterclockwise direction in FIG. 7 from the lock position to the unlock position. When the ink cartridge 30 is further inserted, the slide surface 148 of the engagement member 145 slides on the ramp 49 and the IC board 74 and passes over the recess 78. When the slide surface 148 slides on the HOT electrode 75, the GND electrode 76, and the signal electrode 77, dust is wiped off the HOT electrode 75, the GND electrode 76, and the signal electrode 77.

Referring to FIG. 1, when the ink cartridge 30 is inserted into the case 101, the second protrusion 86 contacts the slider 135. When the ink cartridge 30 is further inserted, the slider 135 is pushed in the insertion direction 56 against the biasing force from the coil spring 139 into the detection point (optical path) of the optical sensor 117. When the optical sensor 117 detects the slider 135, the signal output from the optical sensor 117 to the controller changes from a HI level signal to a LOW level signal.

Referring to FIG. 8, after the second protrusion 86 starts to push the slider 135, the detection portion 89 enters the detection point (optical path) of the optical sensor 114. When the optical sensor 114 detects the detection portion 89, the signal output from the optical sensor 114 to the controller changes from a HI level signal to a LOW level signal.

Referring to FIG. 8, after the detection portion 89 enters the detection point (optical path) of the optical sensor 114, the rib 88 of the first protrusion 85 enters the detection point (optical path) of the optical sensor 116. When the optical sensor 116 detects the rib 88, the signal output from the optical sensor 116 to the controller changes from a HI level signal to a LOW level signal. After the detection portion 89 passes the detection point (optical path) of the optical sensor 114, the gap between the detection portion 89 and the detection portion 33 passes the detection point (optical path) of the optical sensor 114. When this occurs, the signal output from the optical sensor 114 to the controller changes from the LOW level signal to the HI level signal. And then, when the detection portion 33 enters the detection point (optical path) of the optical sensor 114, the signal output from the optical sensor 114 to the controller changes from the HI level signal to the LOW level signal if the sensor arm 60 is in the lower position.

If the detection portion 89 is longer in the depth direction (front-back direction) 53 in one type of the ink cartridge 30, the detection portion 89 is still in the detection point (optical path) of the optical sensor 114 when the rib 88 starts to enter the detection point (optical path) of the optical sensor 116, and therefore, the signal output from the optical sensor 114 is the LOW level signal at a time that the signal output from the optical sensor 116 changes from the HI level signal to the LOW level signal. If the detection portion 89 is shorter in the depth direction (front-back direction) 53 in another type of the ink cartridge 30, the detection portion 89 is no longer in the detection point (optical path) of the optical sensor 114 when the rib 88 starts to enter the detection point (optical path) of the optical sensor 116, and therefore, the signal output from the optical sensor 114 is the HI level signal at a time that the signal output from the optical sensor 116 changes from the HI level signal to the LOW level signal. In other words, the rib 88 and the detection portion 89 are configured to provide information as to the type of the ink cartridge 30 by attenuating the light of the optical sensor 116 and the optical sensor 114.

If the second protrusion 86 is longer in the depth direction (front-back direction) 53 in one type of the ink cartridge 30, the slider 135 is already in the detection point (optical path) of the optical sensor 117 when the rib 88 starts to enter the detection point (optical path) of the optical sensor 116, and therefore, the signal output from the optical sensor 117 is the LOW level signal at a time that the signal output from the optical sensor 116 changes from the HI level signal to the LOW level signal. If the second protrusion 86 is shorter in the depth direction (front-back direction) 53 in another type of the ink cartridge 30, the slider 135 is not yet in the detection point (optical path) of the optical sensor 117 when the rib 88 starts to enter the detection point (optical path) of the optical sensor 116, and therefore, the signal output from the optical sensor 117 is the HI level signal at a time that the signal output from the optical sensor 116 changes from the HI level signal to the LOW level signal.

In other words, the rib 88 and the second protrusion 86 are configured to provide information as to the type of the ink cartridge 30 by attenuating the light of the optical sensor 116 and the optical sensor 117.

Referring to FIG. 8, during the insertion of the ink cartridge 30 into the case 101, the ink supply portion 34 of the ink cartridge 30 is inserted into the holding portion 121 and the ink pipe 122 is inserted into the ink supply opening 71. When this occurs, the ink supply portion 34 is positioned relative to the holding portion 121 with respect to the height direction (up-down direction) 52 by the outer surface of the ink supply portion 34 contacting the inner surface of the holding portion 121, i.e., the main body 31 is positioned relative to the cartridge mounting portion 110 with respect to the height direction (up-down direction) 52. The ink supply valve 70 is pushed by the ink pipe 122, such that the ink supply opening 71 is opened. The ink pipe 122 has an ink introduction opening formed in the distal end thereof, and ink stored in the ink chamber 36 flows into the ink pipe 122 via the ink introduction opening in the insertion direction 56.

Referring to FIG. 8, during the insertion of the ink cartridge 30 into the case 101, the rod 125 enters the opening 96 of the bracket 90. The bracket 90 is movable in the upward direction relative to the main body 31. When the rod 125 enters the opening 96, an upper portion of the outer surface of the rod 125 contact an upper portion of the inner surface 98 of the bracket 90 defining the opening 96, and pushes up the bracket 90, such that the bracket 90 slides on the main body 31 in the upward direction. The bracket 90 cannot move in the downward direction relative to the cartridge mounting portion 110 because the upper portion of the outer surface of the rod 125 contacts the upper portion of the inner surface 98 of the bracket 90 defining the opening 96 from below. Referring to FIG. 9, the rod 125 contacts and pushes the air communication valve 73. The air communication valve 73 moves away from the air communication opening 32, such that air flows into the ink chamber 36 via the air communication opening 32.

Meanwhile, referring to FIGS. 8 and 9, the contacts 106 contact the ramp 49 of the bracket 90. Because the ramp 49 is inclined upward when the contact 106 moves toward the rear wall 42 of the ink cartridge 30 and because the bracket 90 cannot move in the downward direction with the upper portion of the outer surface of the rod 125 contacting the upper portion of the inner surface 98 of the bracket 90 defining the opening 96, the contacts 106 are resiliently deformed in the upward direction when the contacts 106 slides on the ramp 49 and the IC board 74. The resiliently-deformed contacts 106 bias the IC board 74 in the downward direction. When the contacts 106 reach the IC board 74, the bracket 90 is positioned relative to the cartridge mounting portion 110 with respect to the height direction (up-down direction) 52 by the contacts 106 and rod 125 sandwiching the bracket 90 from above and from below, respectively.

When the ink cartridge 30 is further inserted toward the end surface of the case 101, referring to FIG. 9, the contacts 106 contact and are electrically connected to the HOT electrode 75, the GND electrode 76, the signal electrode 77 of the IC board 74, respectively. When the mounting of the ink cartridge 30 reaches the mounted position, the HOT electrode 75, the GND electrode 76, and the signal electrode 77 still contact and are electrically connected to the three contacts 106, respectively.

When the ink cartridge 30 reaches the mounted position, the engagement surface 46 of the engagement portion 45 of the ink cartridge 30 has passed the engagement end 146 of the engagement member 145 in the insertion direction 56. The engagement member 145 pivots in the clockwise direction in FIG. 9 to the lock position, and the engagement end 146 contacts the engagement surface 46. With this contact between the engagement member 145 and the engagement portion 45, the ink cartridge 30 is retained in the mounted position against the biasing force from the coil spring 139. In other words, the ink cartridge 30 is positioned relative to the cartridge mounting portion 110 with respect to the insertion/removal direction 50. As such, the mounting of the ink cartridge 30 to the cartridge mounting portion 110 is completed.

When the ink cartridge 30 is in the mounted position in the cartridge mounting portion 110, the main body 31 is positioned with the ink supply portion 34 inserted into the holding portion 121 and the ink pipe 122 inserted into the ink supply opening 71, and the bracket 90 is positioned sandwiched by the contacts 106 and the rod 125 in a position between the ends of its movable range.

When the ink cartridge 30 is in the mounted position in the cartridge mounting portion 110, the front end portion 81 of the pivot member 80 is positioned below the engagement end 146 of the engagement member 145. The rear end portion 82 of the pivot member 80 is positioned away from the top wall 39.

Based on the level of the output signal from the optical sensor 116, whether the ink cartridge 30 is mounted to the cartridge mounting portion 110 is determined by the controller. In other words, the rib 88 is configured to provide information as to the presence of the ink cartridge 30 in the cartridge mounting portion 110 by attenuating the light of the optical sensor 116. Based on the level of the output signal from the optical sensor 114 and/or based on the level of the output signal from the optical sensor 117 at the time that the signal output from the optical sensor 116 changes from the HI level signal to the LOW level signal, the type of the ink cartridge 30 is determined by the controller. In other words, the rib 88, and the detection portion 89 or the second protrusion 86 are configured to provide information as to the type of the ink cartridge 30 by attenuating the light of the optical sensor 116 and the optical sensor 114 or the optical sensor 117. By periodically checking the level of the output signal from the optical sensor 114, the amount of ink stored in the ink chamber 36 is determined by the controller, i.e., whether the ink chamber 36 has the predetermined amount or more of ink stored therein is determined. In other words, the detection portion 33 is configured to indicate the presence or absence of ink within the ink chamber 36 by attenuating or not attenuating the light of the optical sensor 114. Based on the data read out from the IC board 74, the information of the ink cartridge 30, e.g., the lot number of the ink cartridge 30, the manufacturing date of the ink cartridge 30, the color of ink stored in the ink cartridge 30, and etc. is determined.

In another embodiment, the bracket 90 may be movable in the downward direction relative to the main body 31 in the initial position before the ink cartridge 30 is mounted to the cartridge mounting portion 110. In such a case, the bracket 90 is supported by static friction between the end portions 93, 94 of the bracket 90 and the inclined inner surfaces 47, 48 of the main body 31. When the ink cartridge 30 is inserted into the case 101 and the rod 125 is inserted into the opening 96 of the bracket 90, the outer surface of the rod 125 may not contact the inner surface 98 of the bracket 90 defining the opening 96 initially. When the ink cartridge 30 is further inserted, the contacts 106 contacts the ramp 49 and the IC board 74 and pushes down the bracket 90, such that the upper portion of the outer surface of the rod 125 contacts the upper portion of the inner surface 98 of the bracket 90 defining the opening 96. When the contacts 106 reach the IC board 74, the bracket 90 is positioned relative to the cartridge mounting portion 110 with respect to the height direction (up-down direction) 52 by the contacts 106 and rod 125 sandwiching the bracket 90 from above and from below, respectively.

The time profile of the evens which occur during the insertion of the ink cartridge 30 to the cartridge mounting portion 110 is described in more detail here. When the insertion is started, the slide surface 148 of the engagement portion 145 starts to slide on the IC board 74. The second protrusion 86 then contacts the slider 135 and starts to push the slider 135. The detection portion 89 then starts to enter the detection point (optical path) of the optical sensor 114. The rib 88 then starts to enter the detection point (optical path) of the optical sensor 116. The rod 125 then contacts the air communication valve 73 and starts to push the air communication valve 73. The contacts 106 then starts to contact the IC board 74. The gap between the detection portion 89 and the detection portion 33 then starts to enter the detection point (optical path) of the optical sensor 114. The ink pike 122 then contacts the ink supply valve 70 and starts to push the ink supply valve 70. The detection portion 33 then starts to enter the detection point (optical path) of the optical sensor 114. The engagement end 146 then contacts the engagement surface 46.

After the mounting of the ink cartridge 30 to the cartridge mounting portion 110 is completed. The printer 10 starts printing. When the ink stored in the ink chamber 36 is used up by the printer 10, the used ink cartridge 30 is removed from the cartridge mounting portion 110, and a new ink cartridge 30 is mounted to the cartridge mounting portion 110.

[Removal of ink cartridge 30 from cartridge mounting portion 110]

When the ink cartridge 30 is intended to be removed from the cartridge mounting portion 110, the rear end portion 82 of the pivot member 80 is pushed down by a user. Accordingly, the front end portion 81 of the pivot member 80 moves up and separates from the top wall 39. When this occurs, the engagement member 145 is pushed up by the front end portion 81 of the pivot member 80, and the engagement end 146 of the engagement member 145 moves to a position above the engagement surface 46, i.e., to a position separated from the engagement surface 46. As such, the engagement member 145 moves from the lock position to the unlock position, and the ink cartridge 30 is released from the state held by the engagement member 145.

When the engagement end 146 separates away from the engagement surface 46, an external force applied to the ink cartridge 30 e.g., the biasing force of the coil spring 139 moves the ink cartridge 30 in the removal direction 55. Nevertheless, because a finger of the user still contacts the pushed-down rear end portion 82 of the pivot member 80, the ink cartridge 30 moving in the removal direction 55 is stopped by the user. The biasing force of the coil spring 139 is received by the user's finger via the pivot member 80.

When the user moves his/her finger in the removal direction 55, the ink cartridge 30 moves following the finger, pushed by the slider 135 and the coil spring 139. When this occurs, the IC board 74 disposed on the bracket 90 is released from the downward biasing force of the contacts 106 of the cartridge mounting portion 110. While the ink cartridge 30 moves in the removal direction 55 following the user's finger, the slide surface 148 of the engagement member 145 passes over the recess 78 and slides on the IC board 74 and the ramp 49. When the slide surface 148 slides on the HOT electrode 75, the GND electrode 76, and the signal electrode 77, dust is wiped off the HOT electrode 75, the GND electrode 76, and the signal electrode 77. After sliding on the ramp 49, the slide surface 148 passes over the groove 87. When this occurs, the dust wiped off by the slide surface 148 falls into the groove 87. Accordingly, a likelihood that the dust falls down and adheres to a portion of the ink supply portion 34 surrounding the ink supply opening 71 is reduced.

Meanwhile, the outer surface of the rod 125 separates away from the inner surface 98 of the bracket 90 defining the opening 96, such that the bracket 90 moves down relative to the main body 31 to the initial position in which the bracket 90 is supported by the upper surface of the front portion of the main body 31. The ink pipe 122 is pulled out of the ink supply portion 34. As such, the ink cartridge 30 is removed from the cartridge mounting portion 110.

[Advantages]

In this embodiment, because the ink cartridge 30 comprises the detection portion 89 and the rib 88 configured to be detected by the optical sensors 114, 116 independent of the IC board 74, even if the electrical connection between the IC board 74 and the contacts 106 fails to be established or the data fails to be read out from the IC via the signal electrode 77, it can be determined that the ink cartridge 30 is mounted to the printer 10 based on the information obtained from the detection portion 89 and the rib 88. Therefore, the ink cartridge 30 can be used even if the electrical connection between the IC board 74 and the contacts 106 fails to be established or the data fails to be read out from the IC via the signal electrode 77.

In this embodiment, because the light emitted from the optical sensor 114, 116 travels in the direction (width direction, left-right direction) perpendicular to the insertion direction 50, the detection portion 89 and the rib 88 can enter the detection point (optical path) of the optical sensor 114, 116 in the insertion direction 50 at desired timings. Moreover, because the HOT electrode 75, the GND electrode 76, and the signal electrode 77 are accessible in the downward direction perpendicular to the insertion direction 50 and the direction in which the light travels, even if the HOT electrode 75, the GND electrode 76, and the signal electrode 77 are accessed by the contacts 106 in the downward direction, such that the ink cartridge 30 moves in the downward direction, such movement does not affect the timings of the detection portion 89 and the rib 88 entering the detection point (optical path) of the optical sensor 114, 116 in the insertion direction 56. This is because the timings are determined by the movement of the ink cartridge 30 in the insertion direction 56, and not determined by the downward movement of the ink cartridge 30. Generally speaking, when events occur in directions perpendicular to each other, such events can be independent events and cannot be mutually affected.

In this embodiment, because the HOT electrode 75, the GND electrode 76, and the signal electrode 77 are positioned between the front wall 40 and the rear wall 42, the biasing force from the slider 135 and the coil spring 139 in the removal direction 55 is not directly received by the HOT electrode 75, the GND electrode 76, and the signal electrode 77. Therefore, a likelihood that excessive load is applied to t the HOT electrode 75, the GND electrode 76, and the signal electrode 77 is reduced. Moreover, a likelihood that ink leaks from the ink supply portion 34 and the HOT electrode 75, the GND electrode 76, and the signal electrode 77 are contaminated with ink is reduced.

If the IC board 74 were disposed at the front wall 40 facing the insertion direction 56, the contact between the HOT electrode 75, the GND electrode 76, and the signal electrode 77 and the contacts 106 might be unstable because the ink cartridge 30 is biased in the removal direction 55, i.e., a direction that the HOT electrode 75, the GND electrode 76, and the signal electrode 77 separate away from the contacts 106. Consequently, in such a case, the deformation range of the contacts 106 and the resiliency of the contacts 106 would have to be set greater in order to secure the contact between the HOT electrode 75, the GND electrode 76, and the signal electrode 77 and the contacts 106 even when the HOT electrode 75, the GND electrode 76, and the signal electrode 77 move away from the contacts 106 by the biasing force biasing the ink cartridge 30. Nevertheless, the greater deformation range and greater resiliency of the contacts 106 might apply a great biasing force to the HOT electrode 75, the GND electrode 76, and the signal electrode 77, i.e., excessive load might be applied to the HOT electrode 75, the GND electrode 76, and the signal electrode 77. Moreover, if the IC board 74 were disposed at the front wall 40, ink which has leaked from the ink supply portion 34 might reach the HOT electrode 75, the GND electrode 76, and the signal electrode 77 and cause short circuit between the HOT electrode 75, the GND electrode 76, and the signal electrode 77.

In this embodiment, because the HOT electrode 75, the GND electrode 76, and the signal electrode 77 and the engagement portion 45 are provided at the same side, e.g., the top-wall 39 side, of the ink cartridge 30, the HOT electrode 75, the GND electrode 76, and the signal electrode 77 are positioned adjacent to the engagement portion 45. Because the engagement portion 45 determines the position of the ink cartridge 30 relative to the cartridge mounting portion 110 with respect to the insertion/removal direction 50 when the engagement portion 45 contacts the engagement member 145, the HOT electrode 75, the GND electrode 76, and the signal electrode 77, which are positioned adjacent to the engagement portion 45, can be accurately positioned relative to the contacts 106 with respect to the insertion/removal direction 50.

In this embodiment, because the HOT electrode 75, the GND electrode 76, and the signal electrode 77 are positioned more forward than the engagement surface 46 with respect to the insertion direction 56, and the engagement surface 46 and each of the HOT electrode 75, the GND electrode 76, and the signal electrode 77 intersect the respective plane which is parallel with the height direction (up-down direction) 52 and the depth direction (front-back direction) 53, the engagement member 145 slides on the HOT electrode 75, the GND electrode 76, and the signal electrode 77 during the insertion of the ink cartridge 30 into the cartridge mounting portion 110. Therefore, dust on the HOT electrode 75, the GND electrode 76, and the signal electrode 77 is wiped off and a likelihood that the electrical connection between the HOT electrode 75, the GND electrode 76, and the signal electrode 77 and the contacts 106 becomes unstable is reduced.

In this embodiment, the HOT electrode 75, the GND electrode 76, and the signal electrode 77 are positioned above at least a portion of the engagement surface 46 of the engagement portion 45. Because the engagement member 145 is configured to pivot downward due to its own weight or biased by a spring, dust on the HOT electrode 75, the GND electrode 76, and the signal electrode 77 can be wiped off by the engagement member 145 with stronger downward force. Moreover, the movable range of the engagement member 145 is limited, such that the engagement member 145 does not pivot downward beyond the lock position, if the HOT electrode 75, the GND electrode 76, and the signal electrode 77 were positioned below the engagement surface 46, the engagement member 145 could not contact the HOT electrode 75, the GND electrode 76, and the signal electrode 77. The position of the HOT electrode 75, the GND electrode 76, and the signal electrode 77 above at least a portion of the engagement surface 46 thus facilitates the wiping function of the engagement member 145.

In this embodiment, because the HOT electrode 75, the GND electrode 76, and the signal electrode 77 are positioned more rearward than the ink supply opening 71 of the ink supply portion 34 with respect to the insertion direction 56, even if dust on the HOT electrode 75, the GND electrode 76, and the signal electrode 77 is wiped off when the ink cartridge 30 is inserted into and/or removed from the cartridge mounting portion 110, a likelihood that such dust adheres to the portion of the ink supply portion 34 surrounding the ink supply opening 71 is reduced. Therefore, a likelihood that ink is contaminated by the dust is reduced.

In this embodiment, because the recess, e.g., groove 87 is positioned more forward than the HOT electrode 75, the GND electrode 76, and the signal electrode 77 with respect to the insertion direction 56, the groove 87 and each of the HOT electrode 75, the GND electrode 76, and the signal electrode 77 intersect the respective plane which is parallel with the height direction (up-down direction) 52 and the depth direction (front-back direction) 53, and the HOT electrode 75, the GND electrode 76, and the signal electrode 77 are positioned above the groove 87, dust wiped off of the HOT electrode 75, the GND electrode 76, and the signal electrode 77 falls into the groove 87. Accordingly, a likelihood that the dust falls down and adheres to the portion of the ink supply portion 34 surrounding the ink supply opening 71 is reduced.

In this embodiment, because the ink supply portion 34 is positioned at the front wall 40 and the HOT electrode 75, the GND electrode 76, and the signal electrode 77 are positioned at the top wall 39, a likelihood that ink spattered from the ink supply portion 34 reaches and contaminates the HOT electrode 75, the GND electrode 76, and the signal electrode 77 is reduced.

In this embodiment, because the bracket 90 is movable relative to the main body 31 in the height direction (up-down direction) 52, the bracket 90 and the main body 31 can be independently positioned relative to the cartridge mounting portion 110 with respect to the height direction (up-down direction) 52. Therefore, elements provided at the bracket 90, e.g., the IC board 74, the rib 88, and the detection portion 89, and elements provided at the main body 31, e.g., the ink supply portion 34, can be independently positioned relative to corresponding elements provided at the cartridge mounting portion 110, e.g., the contacts 106, the optical sensors 114, 116, and the ink pipe 122.

Because the ink cartridge 30 is assembled from a plurality of elements, the dimensional tolerance of each element generally needs to be set small, which requires high accuracy in designing and manufacturing each element. If the dimensional tolerance of each element is relatively big, the accumulated dimensional error of the ink cartridge 30 generally becomes big. In such a case, the ink pipe 122 may not be inserted into the ink supply opening 71 and may contact the distal end of the ink supply portion 34 and be broken, the contacts 106 may contact the IC board 74 with high pressure and may be broken, on the contrary the contacts 106 may fail to contact the IC board 74, or the rib 88 and the detection portion 89 may fail to enter between the light emitter and the light receiver of the optical sensor 114, 116. In this embodiment, however, because the bracket 90 is movable relative to the main body 31, the bracket 90 and the main body 31 can be independently positioned relative to the cartridge mounting portion 110, elements provided at the bracket 90, e.g., the IC board 74, the rib 88, and the detection portion 89, and elements provided at the main body 31, e.g., the ink supply portion 34, can be independently positioned relative to corresponding elements provided at the cartridge mounting portion 110, e.g., the contacts 106, the optical sensors 114, 116, and the ink pipe 122, with moderate dimensional tolerances of the elements.

In this embodiment, because the width of each of the HOT electrode 75, the GND electrode 76, and the signal electrode 77 is greater than the width of the rib 88, in other words, the width of the rib 88 is less than the width of each of the HOT electrode 75, the GND electrode 76, and the signal electrode 77, the rib 88 is suitable for non-contact detection by the optical sensor 116 while the HOT electrode 75, the GND electrode 76, and the signal electrode 77 are suitable for physical contact with the contacts 106.

In another embodiment, the second protrusion 86 may comprise a rib, which is similar to the rib 88 of the first protrusion 85, and the optical sensor 117 may be configured to directly detect the rib of the second protrusion 86.

In another embodiment, the range within which the bracket 90 moves relative to the main body 31 may be determined by a known structure, e.g., guide grooves formed in the main body 31 or the bracket 90, other than the elongated openings 91, 92 or the detection portion 33 and the support portion 79. Moreover, the movement of the bracket 90 may be guided by a known structure, e.g., guide rails formed at the main body 31 or the bracket 90, other than the inclined inner surfaces 47, 48.

In another embodiment, the inner surface 98 of the bracket 90 defining the opening 96 may not contact the outer surface of the rod 125 to move the bracket 90 relative to the main body 31. In such a case, the bracket 90 may comprise a surface extending in a direction intersecting the insertion/removal direction 50 at the top face or the bottom face, and when the ink cartridge 30 is inserted into the cartridge mounting portion 110, the surface may contact and slide on a protrusion provided in the cartridge mounting portion 110, such that the bracket 90 moves relative to the main body 31

In another embodiment, the cartridge mounting portion 110 may not comprise the slider 135, the coil spring 139, and the optical sensor 117. In such a case, the ink cartridge 30 may be biased in the removal direction 55 by springs coupled to the ink supply valve 70 and/or the air communication valve 73.

In another embodiment, the IC may not be disposed on the same board on which the HOT electrode 75, the GND electrode 75, and the signal electrode 77 are disposed. For example, the IC may be disposed at or adjacent to the rear wall 42 and may be wired to the HOT electrode 75, the GND electrode 75, and the signal electrode 77 which are disposed at or adjacent to the top wall 39.

In another embodiment, the ink cartridge 30 may not comprise the bracket 90 and the detection portion 89, the rib 88, and the IC board 74 may be disposed on the main body 31.

While the invention has been described in connection with various example structures and illustrative embodiments, it will be understood by those skilled in the art that other variations and modifications of the structures and embodiments described above may be made without departing from the scope of the invention. Other structures and embodiments will be understood by those skilled in the art from a consideration of the specification or practice of the invention disclosed herein. It is intended that the specification and the described examples are merely illustrative and that the scope of the invention is defined by the following claims.

What is claimed is:

1. A printing fluid cartridge, comprising:

a front side, and a rear side positioned opposite the front side with respect to a front-rear direction;

an upper side, and a lower side positioned opposite the upper side with respect to an up-down direction which is perpendicular to the front-rear direction;

a printing fluid supply portion positioned at the front side;

a spring positioned within a cavity that extends from an opening at the front side of the printing fluid cartridge in the front-rear direction;

a circuit board including a plurality of electrodes, the circuit board being positioned at the upper side;

a pivotable member positioned at the upper side between the circuit board and the rear side in the front-rear direction, and configured to pivot about a pivot point;

an engagement surface disposed between the pivotable member and the circuit board at the upper side, the engagement surface facing rearward and extending in the up-down direction; and a top wall at the upper side, wherein the top wall faces upward in the up-down direction, wherein a distance in the up-down direction from the lower side to the spring exceeds a distance in the up-down direction from the lower side to the printing fluid supply portion, wherein a distance in the up-down direction from the lower side to the pivot point, exceeds a distance in the up-down direction from the lower side to the spring, wherein the pivotable member includes a front portion extending in the front-rear direction from the pivot point toward the circuit board, and a rear portion extending in the front-rear direction from the pivot point toward the rear side, wherein the pivotable member is pivotable between a first position in which the front portion of the pivotable member is at its furthest point from the lower side and a second position in which the front portion of the pivotable member is at its closest point to the lower side, wherein the top wall contacts the front portion of the pivotable member from below the front portion of the pivotable member when the pivotable member is in the second position, and wherein when the pivotable member pivots from the second position to the first position, the front portion of the pivotable member moves away from the top wall.

2. The printing fluid cartridge of claim 1, wherein the front portion extends a first distance in the front-rear direction from the pivot point toward the circuit board, and the rear portion extends a second distance in the front-rear direction from the pivot point toward the rear side, and wherein the second distance exceeds the first distance.

3. The printing fluid cartridge of claim 2, wherein a distance in the up-down direction from the lower side to an uppermost part of the engagement surface exceeds a distance in the up-down direction from the lower side to the pivot point of the pivotable member.

4. The printing fluid cartridge of claim 3, wherein the distance in the up-down direction from the lower side to the pivot point exceeds a distance in the up-down direction from the lower side to a lowermost part of the rear portion of the pivotable member when the pivotable member is in the first position, and exceeds a distance in the up-down direction from the lower side to a lowermost part of the front portion of the pivotable member when the pivotable member is in the second position, and wherein the distance in the up-down direction from the lower side to the lowermost part of the front portion of the pivotable member when the pivotable member is in the second position, exceeds the distance in the up-down direction from the lower side to the lowermost part of the rear portion of the pivotable member when the pivotable member is in the first position.

5. The printing fluid cartridge of claim 4, wherein a distance in the up-down direction from the lower side to an uppermost part of the circuit board exceeds the distance in the up-down direction from the lower side to the pivot point of the pivotable member.

6. The printing fluid cartridge of claim 5, wherein the rear portion of the pivotable member includes an inclined surface that extends from adjacent the rear side upward in the up-down direction and frontward in the front-rear direction; and wherein an angle that is formed between the inclined surface and an imaginary line extending in the front-rear direction above the rear portion decreases as the pivotable member rotates from first position to the second position.

7. The printing fluid cartridge of claim 6, wherein the inclined surface has a plurality of ribs disposed thereupon, the ribs extending in a direction that is intersecting the front-rear direction and the up-down direction.

8. The printing fluid cartridge of claim 1, wherein the distance in the up-down direction from the lower side to an uppermost part of the engagement surface exceeds a distance in the up-down direction from the lower side to a frontmost part of the front portion of the pivotable member when the pivotable member is in the second position, and wherein when the pivotable member pivots from the second position to the first position, the frontmost part of the front portion of the pivotable member moves closer to the uppermost part of the engagement surface in the up-down direction.

9. The printing fluid cartridge of claim 8, wherein the distance in the up-down direction from the lower side to the pivot point exceeds a distance in the up-down direction from the lower side to the frontmost part of the front portion of the pivotable member when the pivotable member is in the second position.

10. The printing fluid cartridge of claim 9, wherein a distance in the up-down direction from the lower side to a lowermost part of the front portion of the pivotable member when the pivotable member is in the second position, exceeds a distance in the up-down direction from the lower side to a lowermost part of the rear portion of the pivotable member when the pivotable member is in the first position.

11. The printing fluid cartridge of claim 10, wherein a distance in the up-down direction from the lower side to the pivot point, exceeds the distance in the up-down direction from the lower side to the lowermost part of the rear portion of the pivotable member when the pivotable member is in the first position.

12. The printing fluid cartridge of claim 11, wherein the rear portion of the pivotable member includes an inclined surface that extends from adjacent the rear side upward in the up-down direction and frontward in the front-rear direction, and wherein an angle that is formed between the inclined surface and an imaginary line extending in the front-rear direction above the rear portion decreases as the pivotable member rotates from first position to the second position.

13. The printing fluid cartridge of claim 12, wherein the front portion of the pivotable member comprises a first portion and a second portion, the first portion being positioned between the second portion and the pivot point in the front-rear direction, and the second portion comprises the frontmost part of the front portion of the pivotable member, and wherein when the pivotable member is in the second position, the first portion extends downward in the up-down direction and forward in the front-rear direction away from the pivot point, and a first angle that is formed between the first portion and an imaginary line extending in the front-rear direction is greater than a second angle that is formed between the second portion and the imaginary line, wherein each of the first angle and the second angle is less than 90 degrees.

14. The printing fluid cartridge of claim 13, wherein the engagement surface is perpendicular to the front-rear direction.

15. The printing fluid cartridge of claim 1, wherein the spring extends in the front-rear direction and faces the opening.

16. The printing fluid cartridge of claim 1, wherein the plurality of electrodes of the circuit board includes a first electrode, a second electrode, and a third electrode between the first electrode and the second electrode in a left-right direction which is perpendicular to the front-rear direction and up-down direction, wherein the third electrode and the engagement surface intersect a plane which is parallel with the up-down direction and the front-rear direction.

17. The printing fluid cartridge of claim 16, wherein a width of the front portion of the pivotable member in the left-right direction is greater than a width of the third electrode in the left-right direction.

18. The printing fluid cartridge of claim 17, wherein the width of the front portion of the pivotable member in the left-right direction is less than a width of the circuit board in the left-right direction.

19. The printing fluid cartridge of claim 18, wherein the width of the front portion of the pivotable member in the left-right direction is greater than a width of the first electrode in the left-right direction.

20. The printing fluid cartridge of claim 19, wherein the width of the front portion of the pivotable member in the left-right direction is greater than a width of the second electrode in the left-right direction.

* * * * *